(12) United States Patent
Chen et al.

(10) Patent No.: US 12,416,789 B2
(45) Date of Patent: Sep. 16, 2025

(54) LENS ASSEMBLY

(71) Applicants: Sintai Optical (Shenzhen) Co., Ltd., ShenZhen (CN); Asia Optical Co., Inc., Taichung (TW)

(72) Inventors: Chien-Hung Chen, Taichung (TW); Hsi-Ling Chang, Taichung (TW); Guo-Yang Wu, Taichung (TW); Bo-Yan Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 693 days.

(21) Appl. No.: 17/337,486

(22) Filed: Jun. 3, 2021

(65) Prior Publication Data
US 2021/0405326 A1  Dec. 30, 2021

(30) Foreign Application Priority Data

Jun. 29, 2020  (TW) .................................. 109121824
Mar. 3, 2021   (TW) .................................. 110107535

(51) Int. Cl.
*G02B 9/60* (2006.01)
*G02B 13/00* (2006.01)

(52) U.S. Cl.
CPC .......... *G02B 13/0045* (2013.01); *G02B 9/60* (2013.01); *G02B 13/0065* (2013.01)

(58) Field of Classification Search
CPC ... G02B 13/0045; G02B 13/0065; G02B 9/60
See application file for complete search history.

(56) References Cited

U.S. PATENT DOCUMENTS

| 7,227,706 B2 | 6/2007 | Yagyu et al. |
| 8,009,972 B2 | 8/2011 | Kuroda et al. |
| (Continued) | | |

FOREIGN PATENT DOCUMENTS

| CN | 103592742 A | 2/2014 |
| CN | 103984082 A | 8/2014 |
| (Continued) | | |

OTHER PUBLICATIONS

Melles Griot Practical Application of Light: Catalogue, "Lens Shape"; "Aberration Balancing"; 1999, pp. 1.17, 1.27-1.28 (Year: 1999).*

(Continued)

*Primary Examiner* — Bumsuk Won
*Assistant Examiner* — Samanvitha Sridhar
(74) *Attorney, Agent, or Firm* — McClure, Qualey & Rodack, LLP

(57) ABSTRACT

A lens assembly includes a first lens, a second lens, a third lens, a fourth lens, a fifth lens, and a reflective element. The first lens is with refractive power and includes a concave surface facing an object side along an axis. The second lens is with refractive power and includes a convex surface facing the object side along the axis. The third, fourth, and fifth lenses are with refractive power. The reflective element includes a reflective surface. The first, second, third, fourth, and fifth lenses are arranged in order from the object side to an image side along the axis. The reflective element is disposed between the first lens and the fifth lens. The lens assembly satisfies: 2 mm<L<6 mm; wherein L is an interval from an object side surface of the first lens to the reflective surface along the axis.

16 Claims, 32 Drawing Sheets

(56) References Cited

U.S. PATENT DOCUMENTS

| | | |
|---|---|---|
| 9,557,536 B2 | 1/2017 | Ozaki et al. |
| 9,841,543 B2 | 12/2017 | Shi |
| 10,288,850 B2 | 5/2019 | Ko |
| 10,852,506 B2 * | 12/2020 | Chang ................... G02B 7/04 |
| 12,055,698 B2 * | 8/2024 | Chang ................ G02B 27/0012 |
| 2006/0153553 A1 | 7/2006 | Tochigi et al. |
| 2017/0108670 A1 | 4/2017 | Ko |
| 2018/0039049 A1 * | 2/2018 | Lee .................... G02B 13/0045 |
| 2021/0063702 A1 * | 3/2021 | Kim ...................... H04N 23/55 |
| 2021/0063703 A1 * | 3/2021 | Byun .................... H04N 23/57 |
| 2021/0072501 A1 * | 3/2021 | Chang ................ G02B 13/0065 |
| 2021/0239944 A1 * | 8/2021 | Chang ...................... G02B 9/60 |
| 2022/0026691 A1 * | 1/2022 | Chang ................ G02B 27/0012 |
| 2022/0291491 A1 * | 9/2022 | Chen ................. G02B 27/0012 |

FOREIGN PATENT DOCUMENTS

| | | | | |
|---|---|---|---|---|
| CN | 106597652 A | | 4/2017 | |
| CN | 109239904 A | * | 1/2019 | ......... G02B 13/0015 |
| CN | 209070186 U | | 7/2019 | |
| CN | 110658611 A | | 1/2020 | |
| CN | 111077638 A | * | 4/2020 | |
| JP | 2003098430 A | * | 4/2003 | ............. G02B 13/04 |
| JP | 2006119324 A | | 5/2006 | |
| JP | 2006276816 A | | 10/2006 | |
| JP | 2011022548 A | | 2/2011 | |
| TW | I704387 B | | 9/2020 | |

OTHER PUBLICATIONS

Melles Griot Practical Application of Light: Catalogue, "Lens Shape"; "Aberration Balancing"; 1999, p. 1.17, 1.27-1.28 (Year: 1999).*

Frank L. Pedrotti, "Geometrical Optics", 2007, Introduction to Optics, Pearson Prentice-Hall, pp. 16-49 (Year: 2007).*

* cited by examiner

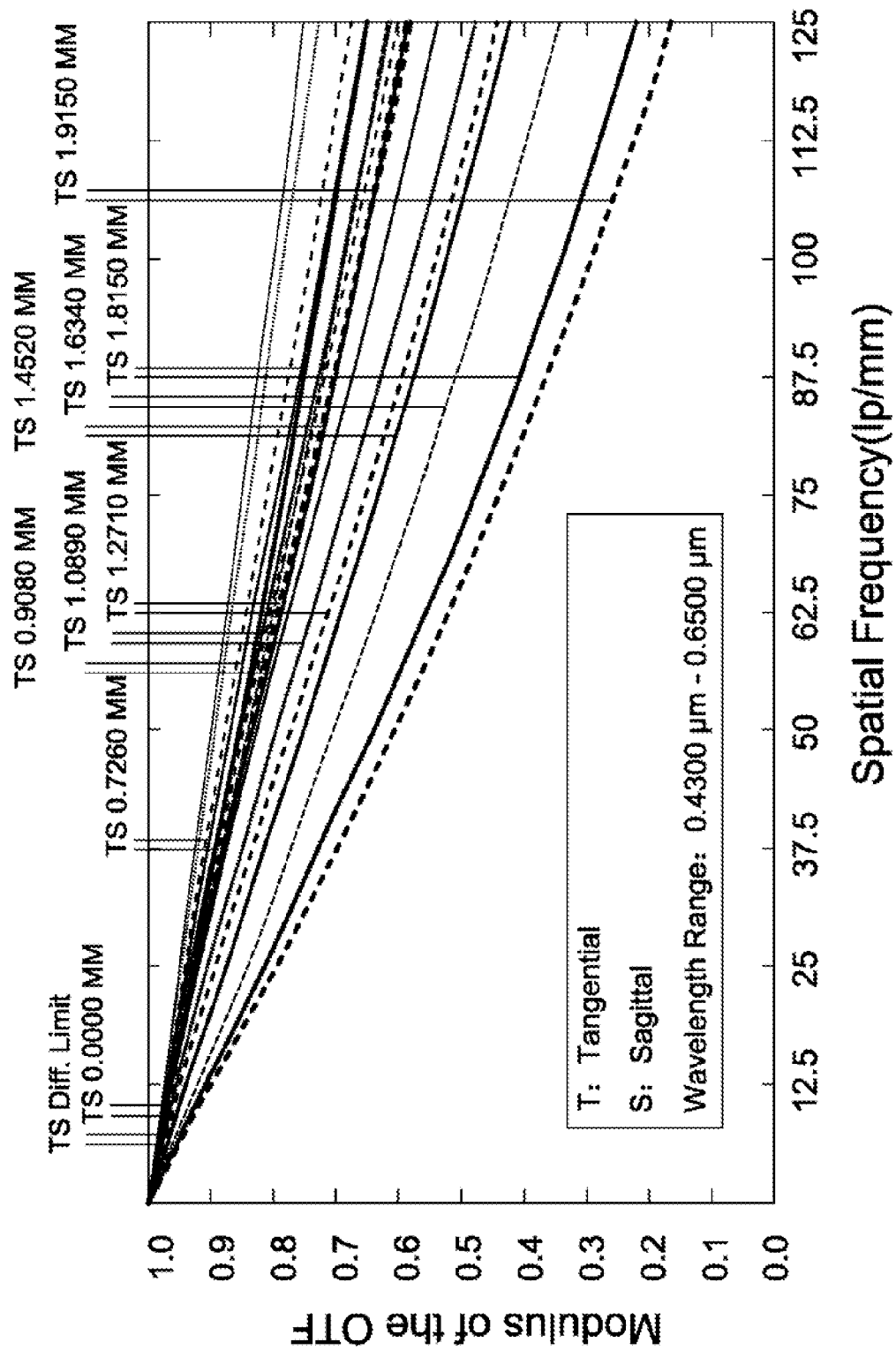

LENS ASSEMBLY

BACKGROUND OF THE INVENTION

Field of the Invention

The invention relates to a lens assembly.

Description of the Related Art

The current development trend of a lens assembly for mobile phone is toward high resolution. The number of lenses used in the lens assembly for mobile phone is increasing, making the total length and outer diameter of the lens assembly for mobile phone is getting longer and larger and the ratio of the volume of the lens assembly to the internal volume of the mobile phone is also getting bigger, which can no longer meet the requirements of thin and light for mobile phone. Therefore, the lens assembly needs a new structure in order to meet the requirements of high resolution and miniaturization at the same time.

BRIEF SUMMARY OF THE INVENTION

The invention provides a lens assembly to solve the above problems. The lens assembly of the invention is provided with characteristics of a shortened total lens length, a decreased outer diameter, an increased resolution, an easy manufacture process, and still has a good optical performance.

The lens assembly in accordance with an exemplary embodiment of the invention includes a first lens, a second lens, a third lens, a fourth lens, a fifth lens, and a reflective element. The first lens is with refractive power and includes a concave surface facing an object side along an axis. The second lens is with refractive power and includes a convex surface facing the object side along the axis. The third lens is with refractive power. The fourth lens is with refractive power. The fifth lens is with refractive power. The reflective element includes a reflective surface. The first lens, the second lens, the third lens, the fourth lens, and the fifth lens are arranged in order from the object side to an image side along the axis. The reflective element is disposed between the first lens and the fifth lens. The lens assembly satisfies: 2 mm<L<6 mm; wherein L is an interval from an object side surface of the first lens to the reflective surface along the axis.

In another exemplary embodiment, the first lens is with negative refractive power, the second lens is with positive refractive power, the third lens is with positive refractive power, the fourth lens is with negative refractive power, and the fifth lens is with positive refractive power.

In yet another exemplary embodiment, the first lens further includes a plane surface or a concave surface facing the image side along the axis, the third lens includes a convex surface facing the object side along the axis, and the fourth lens is a meniscus lens.

In another exemplary embodiment, the fifth lens includes a convex surface facing the image side along the axis and another convex surface or a concave surface facing the object side along the axis.

In yet another exemplary embodiment, the second lens is a biconvex lens and further includes another convex surface facing the image side along the axis, the third lens is a meniscus lens and further includes a concave surface facing the image side along the axis, and the fourth lens includes a concave surface facing the object side along the axis and a convex surface facing the image side along the axis.

In another exemplary embodiment, the second lens is a meniscus lens and further includes a concave surface facing the image side along the axis, the third lens is a biconvex lens and further includes a convex surface facing the image side along the axis, and the fourth lens includes a convex surface facing the object side along the axis and a concave surface facing the image side along the axis.

In yet another exemplary embodiment, the lens assembly satisfies at least any one of the following conditions: $0.1<SD5/TTL<0.6$; $3.5<TTL/SD1<14$; $0.5<SD1/L1T<3$; wherein SD1 is an effective optical diameter of the first lens, SD5 is an effective optical diameter of the fifth lens, TTL is an interval from the object side surface of the first lens to an image plane along the axis, and L1T is a thickness along the axis of the first lens.

In another exemplary embodiment, the reflective element further includes an incident surface facing the object side along the axis and an exit surface facing the image side along the axis and the lens assembly satisfies at least any one of the following conditions: $0.5<MT/L1T<10$; $0<MT/(SD2+SD3+SD4+SD5)<1$; wherein MT is an interval from the incident surface to the exit surface along the axis, L1T is a thickness along the axis of the first lens, SD2 is an effective optical diameter of the second lens, SD3 is an effective optical diameter of the third lens, SD4 is an effective optical diameter of the fourth lens, and SD5 is an effective optical diameter of the fifth lens.

In yet another exemplary embodiment, the lens assembly satisfies at least any one of the following conditions: $0<f/L1T<5$; $1<TTL/L<5$; $0<f/L<2$; $-20<R_{11}/L1T<0$; wherein TTL is an interval from the object side surface of the first lens to an image plane along the axis, L is the interval from the object side surface of the first lens to the reflective surface along the axis, f is an effective focal length of the lens assembly, $R_{11}$ is a radius of curvature of the object side surface of the first lens, and L1T is a thickness along the axis of the first lens.

In another exemplary embodiment, the lens assembly satisfies at least any one of the following conditions: $2<ALD/f<8$; $-12<f_1/L1T<0$; wherein ALD is a total sum of the effective optical diameter of all lenses of the lens assembly, f is an effective focal length of the lens assembly, $f_1$ is an effective focal length of the first lens, and L1T is a thickness along the optical axis of the first lens.

In yet another exemplary embodiment, the first lens is a meniscus lens with positive refractive power, the second lens is with negative refractive power, and the fourth lens is with positive refractive power.

In another exemplary embodiment, the first lens further includes a convex surface facing the image side along the axis, the second lens is a meniscus lens and further includes a concave surface facing the image side along the axis, and the fifth lens is a meniscus lens and includes a convex surface facing the object side along the axis and a concave surface facing the image side along the axis.

In yet another exemplary embodiment, the fourth lens includes a convex surface facing the image side along the axis and another convex surface or a concave surface facing the object side along the axis.

In another exemplary embodiment, the third lens is a biconvex lens with positive refractive power and includes a convex surface facing the object side along the axis and another convex surface facing the image side along the axis and the fifth lens is with positive refractive power.

In yet another exemplary embodiment, the third lens is a meniscus lens with negative refractive power and includes a convex surface facing the object side along the axis and a concave surface facing the image side along the axis and the fifth lens is with positive refractive power.

In another exemplary embodiment, the third lens is a meniscus lens with negative refractive power and includes a concave surface facing the object side along the axis and a convex surface facing the image side along the axis and the fifth lens is with negative refractive power.

In yet another exemplary embodiment, the lens assembly satisfies at least any one of the following conditions: $-20<R_{11}/L1T<0$; $3.5<TTL/SD1<14$; wherein $R_{11}$ is a radius of curvature of the object side surface of the first lens, L1T is a thickness along the axis of the first lens, TTL is an interval from the object side surface of the first lens to an image plane along the axis, and SD1 is an effective optical diameter of the first lens.

In another exemplary embodiment, the lens assembly satisfies at least any one of the following conditions: $3<(f_1+f)/SD1<5$; $-6<R_{11}/R_{52}<-0.5$; $1<f_1/L1T<4$; $1$ mm$^2<f_1 \times f_4<11$ mm$^2$; $-12$ mm$^2<f_2 \times f_4<-1$ mm$^2$; wherein $R_{11}$ is a radius of curvature of the object side surface of the first lens, $R_{52}$ is a radius of curvature of an image side surface of the fifth lens, f is an effective focal length of the lens assembly, $f_1$ is an effective focal length of the first lens, $f_2$ is an effective focal length of the second lens, $f_4$ is an effective focal length of the fourth lens, L1T is a thickness along the axis of the first lens, and SD1 is an effective optical diameter of the first lens.

In yet another exemplary embodiment, the lens assembly satisfies the following condition: $0.5<f_1/L<2.5$; wherein $f_1$ is an effective focal length of the first lens and L is the interval from the object side surface of the first lens to the reflective surface along the axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6A, FIG. 6B, and FIG. 6C depict a field curvature diagram, a distortion diagram, and a modulation transfer function diagram of the lens assembly respectively in accordance with the third embodiment of the invention;

DETAILED DESCRIPTION OF THE INVENTION

Figure 1:
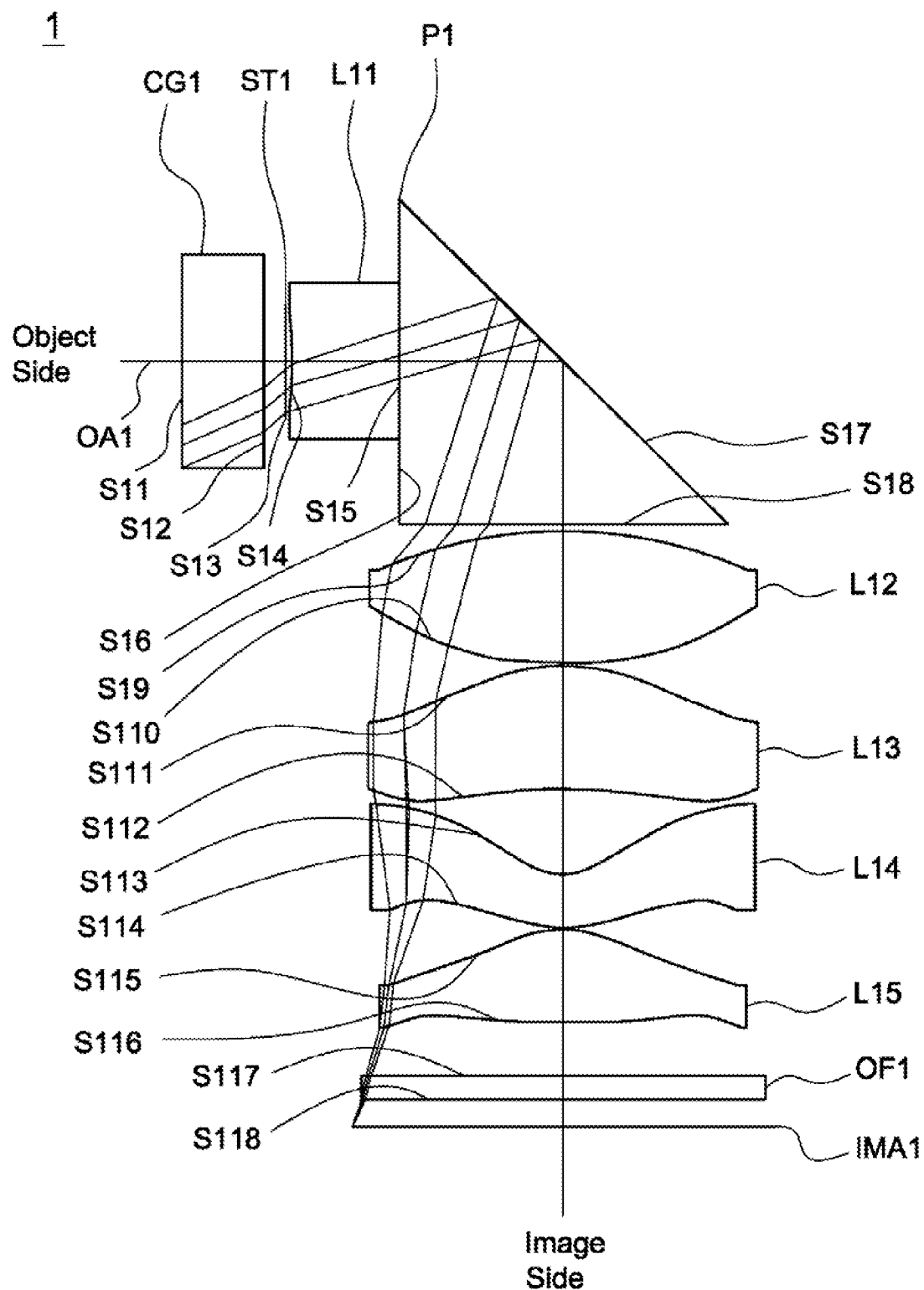
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, and a reflective element. The first lens is with refractive power and includes a concave surface facing an object side along an axis. The second lens is with refractive power and includes a convex surface facing the object side along the axis. The third lens is with refractive power. The fourth lens is with refractive power. The fifth lens is with refractive power. The reflective element includes a reflective surface. The first lens, the second lens, the third lens, the fourth lens, and the fifth lens are arranged in order from the object side to the image side along the axis. The reflective element is disposed between the first lens and the fifth lens. The lens assembly satisfies: 2 mm<L<6 mm; wherein L is an interval from an object side surface of the first lens to the reflective surface along the axis.

Referring to Table 1, Table 2, Table 4, Table 5, Table 7, Table 8, Table 10, and Table 11, wherein Table 1, Table 4, Table 7, and Table 10 show optical specification in accordance with a first, second, third, and fourth embodiments of the invention respectively and Table 2, Table 5, Table 8, and Table 11 show aspheric coefficients of each aspheric lens in Table 1, Table 4, Table 7, and Table 10 respectively. FIG. 1, FIG. 3, FIG. 5, and FIG. 7 are lens layout and optical path diagrams of the lens assemblies in accordance with the first, second, third, and fourth embodiments of the invention respectively.

The first lenses L11, L21, L31, L41 are with negative refractive power and made of glass material, wherein the object side surfaces S14, S24, S34, S44 are concave surfaces.

The reflective elements P1, P2, P3, P4 are made of glass or plastic material, wherein the incident surfaces S16, S26, S36, S46 are plane surfaces, the reflective surfaces S17, S27, S37, S47 are plane surfaces, and the exit surfaces S18, S28, S38, S48 are plane surfaces. The reflective element can also be a prism or a reflective mirror. The reflective element can also only include one reflective surface when the reflective element is a reflective mirror.

The second lenses L12, L22, L32, L42 are with positive refractive power and made of plastic material, wherein the object side surfaces S19, S29, S39, S49 are convex surfaces and both of the object side surfaces S19, S29, S39, S49 and image side surfaces S110, S210, S310, S410 are aspheric surfaces.

The third lenses L13, L23, L33, L43 are with positive refractive power and made of plastic material, wherein the object side surfaces S111, S211, S311, S411 are convex surfaces and both of the object side surfaces S111, S211, S311, S411 and image side surfaces S112, S212, S312, S412 are aspheric surfaces.

The fourth lenses L14, L24, L34, L44 are with negative refractive power and made of plastic material, wherein both of the object side surfaces S113, S213, S313, S413 and image side surfaces S114, S214, S314, S414 are aspheric surfaces.

The fifth lenses L15, L25, L35, L45 are with positive refractive power and made of plastic material, wherein the image side surfaces S116, S216, S316, S416 are convex surfaces and both of the object side surfaces S115, S215, S315, S415 and image side surfaces S116, S216, S316, S416 are aspheric surfaces.

In addition, the lens assemblies 1, 2, 3, 4 satisfy at least any one of the following conditions:

$$2 \text{ mm} < L < 6 \text{ mm}; \quad (1)$$

$$3.5 < TTL/SD1 < 14; \quad (2)$$

$$0.5 < MT/L1T < 10; \quad (3)$$

$$0 < MT/(SD2+SD3+SD4+SD5) < 1; \quad (4)$$

$$-20 < R_{11}/L1T < 0; \quad (5)$$

$$-12 < f_1/L1T < 0; \quad (6)$$

$$0.1 < SD5/TTL < 0.6; \quad (7)$$

$$1 < TTL/L < 5; \quad (8)$$

$$0 < f/L < 2; \quad (9)$$

$$0.5 < SD1/L1T < 3; \quad (10)$$

$$2 < ALD/f < 8; \quad (11)$$

$$0 < f/L1T < 5; \quad (12)$$

wherein L is an interval from the object side surfaces S14, S24, S34, S44 of the first lenses L11, L21, L31, L41 to the reflective surfaces S17, S27, S37, S47 along the axes OA1, OA2, OA3, OA4 respectively for the first to fourth embodiments, MT is an interval from the incident surfaces S16, S26, S36, S46 to the exit surfaces S18, S28, S38, S48 along the axes OA1, OA2, OA3, OA4 respectively for the first to fourth embodiments, SD1 is an effective optical diameter of the first lenses L11, L21, L31, L41 for the first to fourth embodiments, SD2 is an effective optical diameter of the second lenses L12, L22, L32, L42 for the first to fourth embodiments, SD3 is an effective optical diameter of the third lenses L13, L23, L33, L43 for the first to fourth embodiments, SD4 is an effective optical diameter of the fourth lenses L14, L24, L34, L44 for the first to fourth embodiments, SD5 is an effective optical diameter of the fifth lenses L15, L25, L35, L45 for the first to fourth embodiments, f is an effective focal length of the lens assemblies 1, 2, 3, 4 for the first to fourth embodiments, $f_1$ is an effective focal length of the first lenses L11, L21, L31, L41 for the first to fourth embodiments, L1T is a thickness along the axes OA1, OA2, OA3, OA4 of the first lenses L11, L21, L31, L41 for the first to fourth embodiments, that is, an interval from the object side surfaces S14, S24, S34, S44 of the first lenses L11, L21, L31, L41 to the image side surfaces S15, S25, S35, S45 along the axes OA1, OA2, OA3, OA4, TTL is an interval from the object side surfaces S14, S24, S34, S44 of the first lenses L11, L21, L31, L41 to the image planes IMA1, IMA2, IMA3, IMA4 along the axes OA1, OA2, OA3, OA4 respectively for the first to fourth embodiments, $R_{11}$ is a radius of curvature of the object side surfaces S14, S24, S34, S44 of the first lenses L11, L21, L31, L41 for the first to fourth embodiments, and ALD is a total sum of the effective optical diameter of all lenses for the first to fourth embodiments. With the lens assemblies 1, 2, 3, 4 satisfying at least any one of the above conditions (1)-(12), the total lens length can be effectively shortened, the outer diameter can be effectively decreased, the resolution can be effectively increased, the aberration can be effectively corrected, the chromatic aberration can be effectively corrected, and easy to manufacture process.

A detailed description of a lens assembly in accordance with a first embodiment of the invention is as follows. Referring to FIG. 1, the lens assembly 1 includes a cover glass CG1, a stop ST1, a first lens L11, a reflective element P1, a second lens L12, a third lens L13, a fourth lens L14, a fifth lens L15, and an optical filter OF1, all of which are arranged in order from an object side to an image side along an axis OA1. The reflective element P1 includes an incident surface S16, a reflective surface S17, and an exit surface S18, wherein the incident surface S16 and the exit surface S18 are perpendicular to each other. In operation, the light from the object side is reflected by the reflective surface S17 to change the propagation direction and imaged on an image plane IMA1. The image plane IMA1 and the exit surface S18 are parallel to each other. In the first embodiment, the reflective element takes a prism as an example but is not limited thereto. For example, the reflective element may be a reflective mirror which only includes a reflective surface.

According to the foregoing, wherein: both of the object side surface S11 and image side surface S12 of the cover glass CG1 are plane surfaces; the first lens L11 is a plane-concave lens, wherein the image side surface S15 is a plane surface and the object side surface S14 is a spherical surface; the second lens L12 is a biconvex lens, wherein the image side surface S110 is a convex surface; the third lens L13 is a meniscus lens, wherein the image side surface S112 is a concave surface; the fourth lens L14 is a meniscus lens, wherein the object side surface S113 is a concave surface and the image side surface S114 is a convex surface; the fifth lens L15 is a biconvex lens, wherein the object side surface S115 is a convex surface; and both of the object side surface S117 and image side surface S118 of the optical filter OF1 are plane surfaces.

With the above design of the lenses, stop ST1, reflective element P1, and at least any one of the conditions (1)-(12) satisfied, the lens assembly 1 can have an effective shortened total lens length, an effective decreased outer diameter, an effective increased resolution, an effective corrected aberration, an effective corrected chromatic aberration, and is capable of an easy manufacture process.

Table 1 shows the optical specification of the lens assembly 1 in FIG. 1.

TABLE 1

Effective Focal Length = 2.36146 mm  F-number = 2.4
Total Lens Length = 10.52 mm  Field of View = 78 degrees

| Surface Number | Radius of Curvature (mm) | Thickness (mm) | Nd | Vd | Effective Focal Length (mm) | Remark |
|---|---|---|---|---|---|---|
| S11  | ∞         | 0.75       | 1.5168   | 64.167336 |          | CG1 |
| S12  | ∞         | 0.2        |          |           |          |     |
| S13  | ∞         | 0.05010699 |          |           |          | ST1 |
| S14  | −6.399133 | 1          | 2.003303 | 28.319976 | −6.33767 | L11 |
| S15  | ∞         | 0          |          |           |          |     |
| S16  | ∞         | 1.5        | 2.003303 | 28.319976 |          | P1 Incident Surface |
| S17  | ∞         | 1.5        | 2.003303 | 28.319976 |          | P1 Reflective Surface |
| S18  | ∞         | 0.05       |          |           |          | P1 Exit Surface |
| S19  | 4.30236   | 1.220212   | 1.535218 | 56.115254 | 3.89889  | L12 |
| S110 | −3.673788 | 0.025      |          |           |          |     |
| S111 | 1.862688  | 1.127119   | 1.535218 | 56.115254 | 5.01234  | L13 |
| S112 | 4.770468  | 0.7807939  |          |           |          |     |
| S113 | −0.437913 | 0.487242   | 1.671339 | 19.242889 | −1.40602 | L14 |
| S114 | −1.174612 | 0.015      |          |           |          |     |
| S115 | 0.8410429 | 0.8553014  | 1.535081 | 55.779665 | 1.54751  | L15 |
| S116 | −43.79546 | 0.5        |          |           |          |     |
| S117 | ∞         | 0.21       | 1.5168   | 64.167336 |          | OF1 |
| S118 | ∞         | 0.25       |          |           |          |     |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20} + Jh^3 + Kh^5 + Lh^7$$

where c is curvature, h is the vertical distance from the lens surface to the optical axis, k is conic constant and A, B, C, D, E, F, G, H, I, J, K and L are aspheric coefficients.

In the first embodiment, the conic constant k and the aspheric coefficients A, B, C, D, E, F, G, H, I, J, K, L of each aspheric lens are shown in Table 2.

TABLE 2

| Surface Number | k | A | B | C | D | E | F |
|---|---|---|---|---|---|---|---|
|   |   | G | H | I | J | K | L |
| S19  | −36.04416  | −6.4247E−02 | 5.6985E−02  | −2.5117E−02 | 5.7448E−03  | −2.3892E−04 | −1.1273E−04 |
|      |            | −1.4731E−05 | 1.1584E−05  | −1.0947E−06 | −1.4817E−02 | −1.4010E−03 | −1.0969E−03 |
| S110 | 2.6602     | 1.2024E−01  | −4.5800E−02 | 1.1232E−02  | −1.7176E−03 | −7.2719E−05 | 4.5098E−05  |
|      |            | 1.0977E−05  | −2.2770E−06 | −1.5996E−07 | −1.1107E−01 | 2.4481E−02  | −6.0939E−03 |
| S111 | −0.3378937 | 1.3195E−01  | −6.0139E−02 | 2.4629E−02  | −5.2884E−03 | 3.1803E−04  | −1.3230E−04 |
|      |            | 3.0679E−05  | 2.0153E−05  | −4.6069E−06 | −9.0329E−02 | 2.9799E−02  | −1.6650E−03 |
| S112 | 1.034241   | −3.7632E−02 | 1.8802E−02  | −1.6136E−02 | 5.0841E−03  | −6.1590E−04 | −1.6311E−04 |
|      |            | 7.0473E−06  | 1.6313E−05  | −2.7390E−06 | 3.1593E−02  | 8.9310E−03  | 1.1042E−02  |
| S113 | −2.784855  | 5.1219E−02  | −6.1254E−02 | 2.4460E−02  | −1.2739E−03 | −1.2216E−03 | 3.5027E−04  |
|      |            | −2.3110E−05 | −1.3055E−05 | 2.1766E−06  | −7.7116E−02 | −8.7436E−03 | 6.8449E−04  |
| S114 | −4.268764  | 9.7529E−02  | −1.0727E−01 | 3.0119E−02  | −8.9519E−04 | −3.0243E−03 | 9.8545E−04  |
|      |            | 9.6734E−06  | −2.0888E−05 | −2.1280E−06 | −1.5871E−01 | 6.7286E−02  | −1.0446E−02 |
| S115 | −5.17819   | 2.1008E−01  | −9.0676E−02 | 6.7556E−02  | −3.7242E−02 | 6.3652E−03  | −1.0431E−04 |
|      |            | 1.0062E−03  | −5.4799E−04 | 8.0685E−05  | −1.2006E−01 | −3.2558E−02 | 1.1295E−02  |
| S116 | 652.8874   | −3.1732E−02 | 1.8180E−01  | −7.5323E−02 | 1.0583E−02  | −1.1999E−04 | −1.3128E−04 |
|      |            | −3.1456E−05 | 9.6217E−05  | −2.2518E−05 | 1.0825E−01  | −1.7720E−01 | 2.1218E−02  |

Table 3 shows the parameters and condition values for conditions (1)-(12) in accordance with the first embodiment of the invention. It can be seen from Table 3 that the lens assembly 1 of the first embodiment satisfies the conditions (1)-(12).

TABLE 3

| SD1 | 1.43 mm | SD2 | | 3.56 mm | SD3 | 3.63 mm |
|---|---|---|---|---|---|---|
| SD4 | 3.56 mm | SD5 | | 3.27 mm | MT | 3 mm |
| L | 2.5 mm | ALD | | 15.45 mm | | |
| $f_1$/L1T | −6.33767 | SD5/TTL | | 0.310837 | TTL/SD1 | 7.356643 |
| MT/L1T | 3 | MT/(SD2 + SD3 + SD4 + SD5) | | 0.21398 | TTL/L | 4.208 |
| f/L | 0.944584 | $R_{11}$/L1T | | −6.39913 | SD1/L1T | 1.43 |
| ALD/f | 6.542563 | f/L1T | | 2.36146 | | |

Figure 2A:
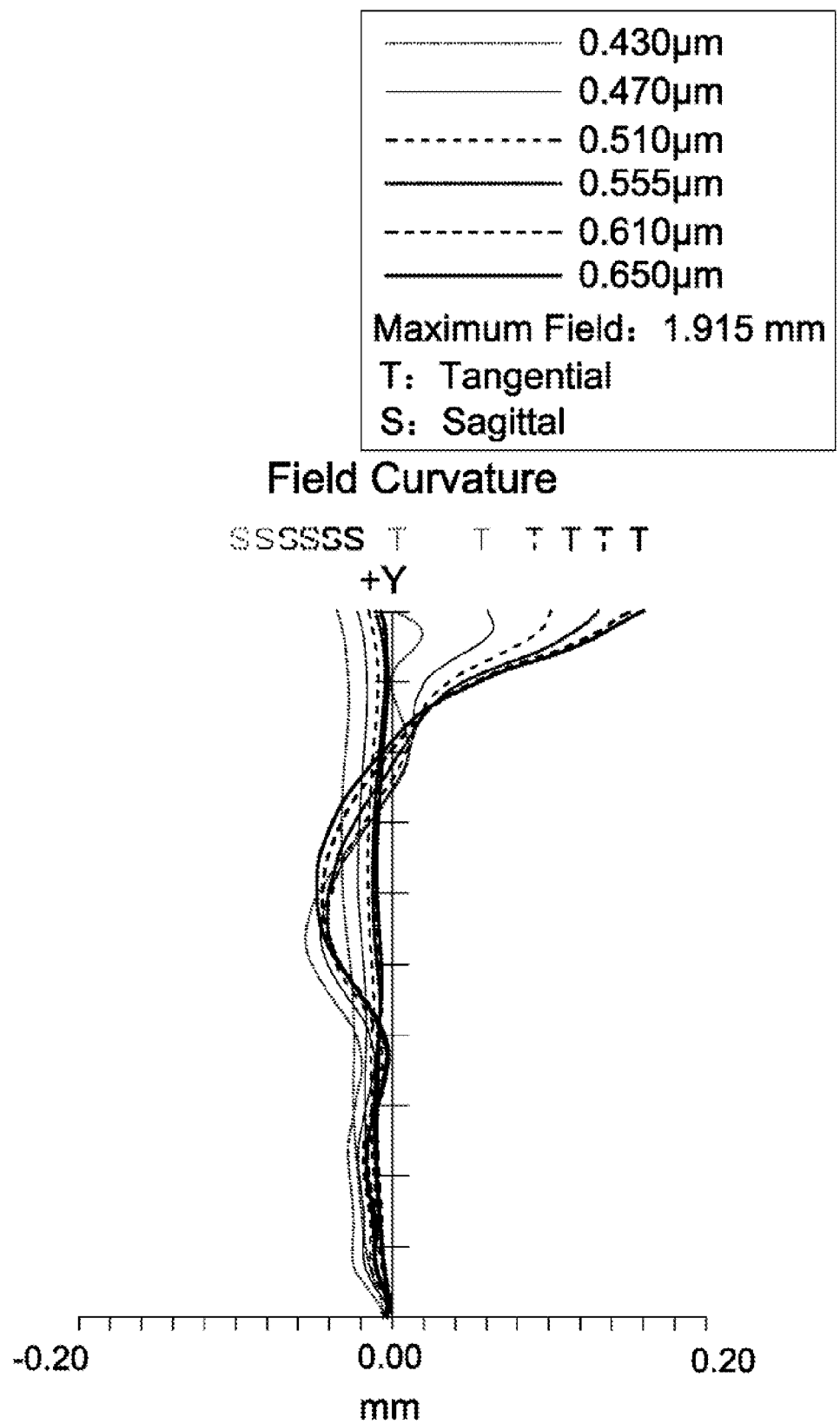
FIG. 2A, FIG. 2B, and FIG. 2C depict a field curvature diagram, a distortion diagram, and a modulation transfer function diagram of the lens assembly respectively in accordance with the first embodiment of the invention.
Figure 2B:
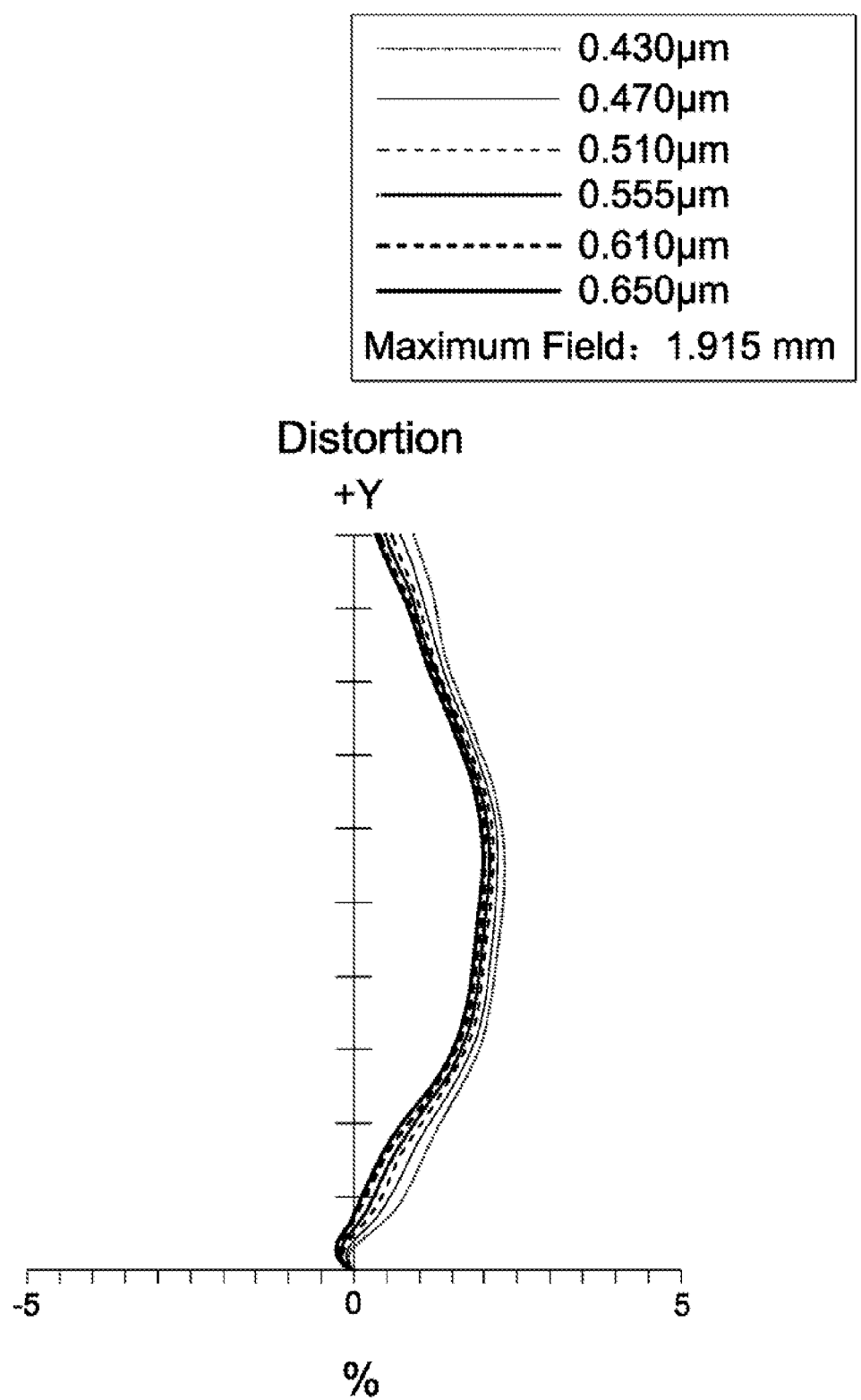
Figure 2C:
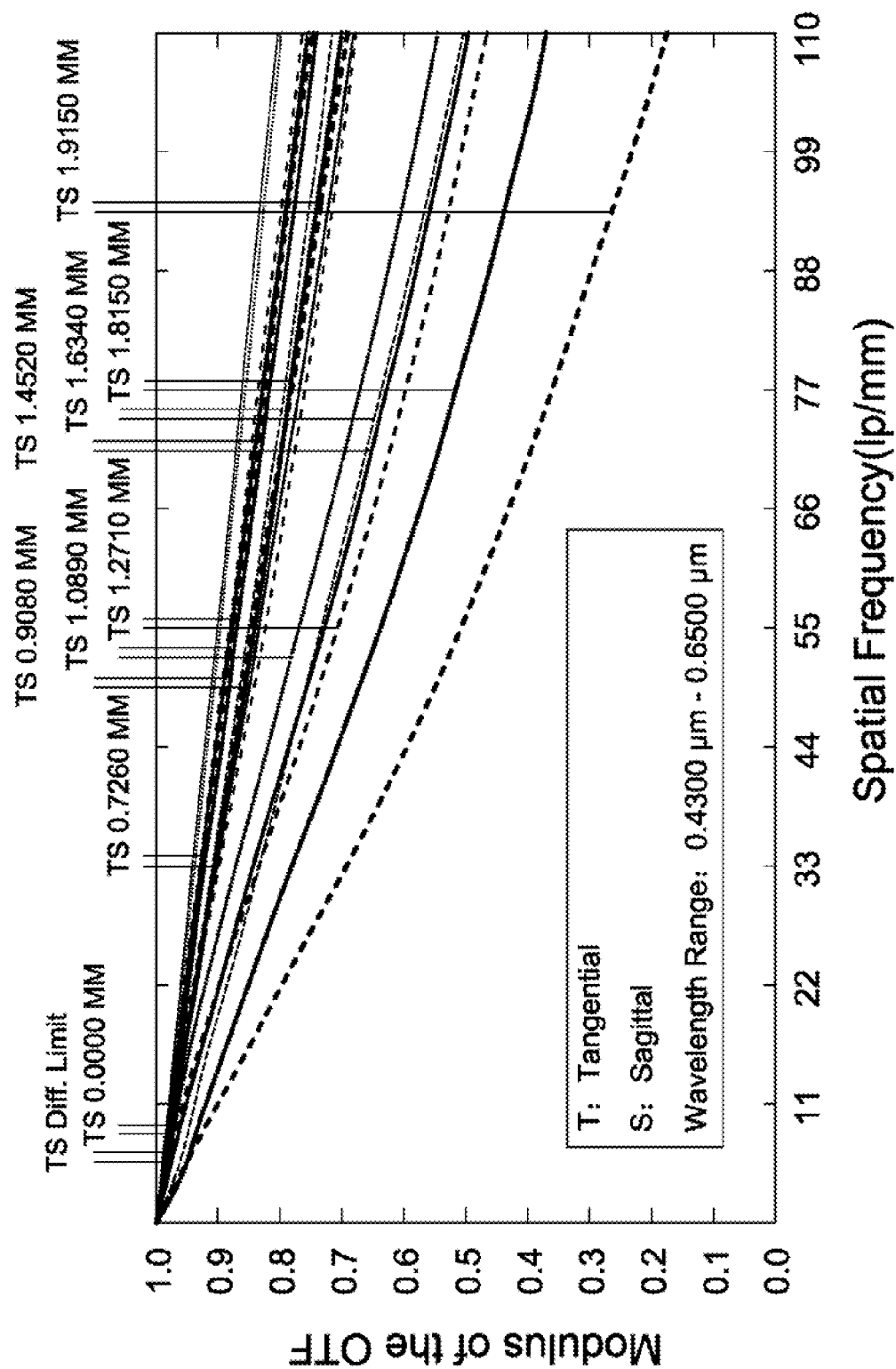

In addition, the lens assembly 1 of the first embodiment can meet the requirements of optical performance as seen in FIGS. 2A-2C. It can be seen from FIG. 2A that the field curvature of tangential direction and sagittal direction in the lens assembly 1 of the first embodiment ranges from 0.06 mm to 0.16 mm. It can be seen from FIG. 2B that the distortion in the lens assembly 1 of the first embodiment ranges from −0.5% to 2.5%. It can be seen from FIG. 2C that the modulation transfer function of tangential direction and sagittal direction in the lens assembly 1 of the first embodiment ranges from 0.17 to 1.0. It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
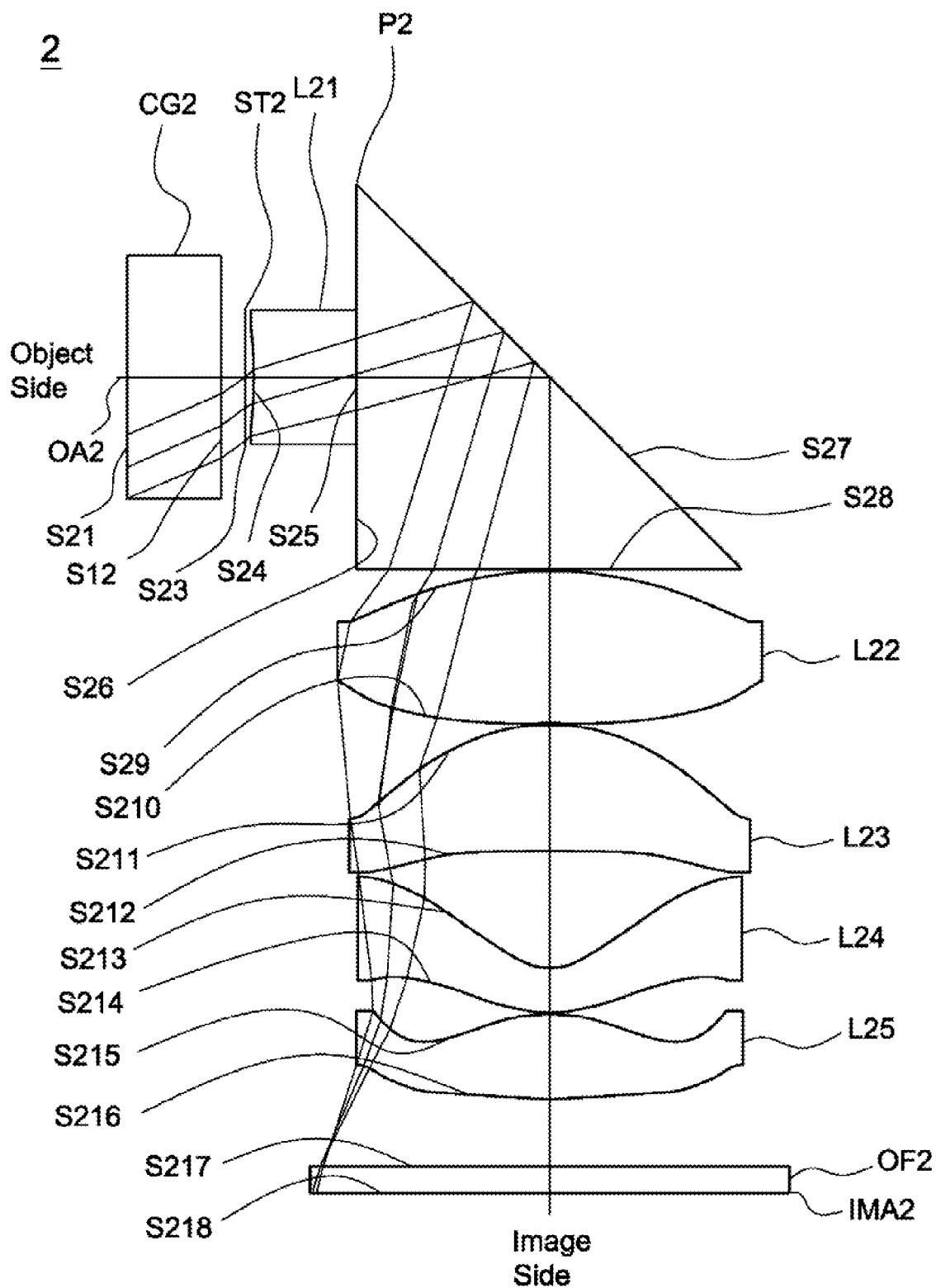
FIG. 3 is a lens layout and optical path diagram of a lens assembly in accordance with a second embodiment of the invention.

Referring to FIG. 3, the lens assembly 2 includes a cover glass CG2, a stop ST2, a first lens L21, a reflective element P2, a second lens L22, a third lens L23, a fourth lens L24, a fifth lens L25, and an optical filter OF2, all of which are arranged in order from an object side to an image side along an axis OA2. The reflective element P2 includes an incident surface S26, a reflective surface S27, and an exit surface S28, wherein the incident surface S26 and the exit surface S28 are perpendicular to each other. In operation, the light from the object side is reflected by the reflective surface S27 to change the propagation direction and imaged on an image plane IMA2. The image plane IMA2 and the exit surface S28 are parallel to each other. In the second embodiment, the reflective element takes a prism as an example but is not limited thereto. For example, the reflective element may be a reflective mirror which only includes a reflective surface.

According to the foregoing, wherein: both of the object side surface S21 and image side surface S22 of the cover glass CG2 are plane surfaces; the first lens L21 is a plane-concave lens, wherein the image side surface S25 is a plane surface and the object side surface S24 is an aspheric surface; the second lens L22 is a biconvex lens, wherein the image side surface S210 is a convex surface; the third lens L23 is a meniscus lens, wherein the image side surface S212 is a concave surface; the fourth lens L24 is a meniscus lens, wherein the object side surface S213 is a concave surface and the image side surface S214 is a convex surface; the fifth lens L25 is a biconvex lens, wherein the object side surface S215 is a convex surface; and both of the object side surface S217 and image side surface S218 of the optical filter OF2 are plane surfaces.

With the above design of the lenses, stop ST2, reflective element P2, and at least any one of the conditions (1)-(12) satisfied, the lens assembly 2 can have an effective shortened total lens length, an effective decreased outer diameter, an effective increased resolution, an effective corrected aberration, an effective corrected chromatic aberration, and is capable of an easy manufacture process.

Table 4 shows the optical specification of the lens assembly 2 in FIG. 3.

TABLE 4

Effective Focal Length = 2.55359 mm F-number = 2.4
Total Lens Length = 9.98 mm Field of View = 76 degrees

| Surface Number | Radius of Curvature (mm) | Thickness (mm) | Nd | Vd | Effective Focal Length (mm) | Remark |
|---|---|---|---|---|---|---|
| S21 | ∞ | 0.75 | 1.5168 | 64.167336 | | CG2 |
| S22 | ∞ | 0.2 | | | | |
| S23 | ∞ | 0.06 | | | | ST2 |
| S24 | −7.518558 | 0.84 | 2.0033 | 28.32 | −7.44636 | L21 |
| S25 | ∞ | 0 | | | | |
| S26 | ∞ | 1.55 | 2.0033 | 28.32 | | P2 Incident Surface |
| S27 | ∞ | 1.55 | 2.0033 | 28.32 | | P2 Reflective Surface |
| S28 | ∞ | 0.015 | | | | P2 Exit Surface |
| S29 | 3.427519 | 1.227709 | 1.5352 | 56.11 | 5.36455 | L22 |
| S210 | −15.78844 | 0.015 | | | | |
| S211 | 1.554132 | 1.01393 | 1.5352 | 56.11 | 3.05754 | L23 |
| S212 | 22.49015 | 0.9438974 | | | | |
| S213 | −0.4246024 | 0.363 | 1.670993 | 19.243508 | −1.42553 | L24 |
| S214 | −1.019583 | 0.015 | | | | |
| S215 | 1.214293 | 0.6850868 | 1.535056 | 56.110001 | 1.66977 | L25 |
| S216 | −2.748457 | 0.54 | | | | |
| S217 | ∞ | 0.21 | 1.5168 | 64.167336 | | OF2 |
| S218 | ∞ | 0 | | | | |

The definition of aspheric surface sag z of each aspheric lens in table 4 is the same as that of in Table 1, and is not described here again.

In the second embodiment, the conic constant k and the aspheric coefficients A, B, C, D, E, F, G, H, I, J, K, L of each aspheric lens are shown in Table 5.

TABLE 5

| Surface Number | k | A G | B H | C I | D J | E K | F L |
|---|---|---|---|---|---|---|---|
| S24 | 47.67621 | 4.3407E−02 −1.5929E+02 | −1.0693E+00 0 | 1.2987E+01 0 | −7.4448E+01 0 | 1.9156E+02 0 | −1.2784E+02 0 |
| S29 | 0.6329401 | −2.1170E−02 2.9490E−05 | 1.6332E−02 0 | −5.6300E−03 0 | 9.6280E−04 0 | 2.0490E−04 0 | −1.4287E−04 0 |
| S210 | −100.8146 | 2.9445E−02 −4.2654E−05 | −5.6494E−05 0 | 3.3710E−03 0 | −1.1380E−03 0 | −7.1591E−04 0 | 3.8440E−04 0 |
| S211 | −0.145394 | 3.5712E−02 1.5400E−04 | −1.0172E−02 0 | 4.5920E−03 0 | 1.9470E−03 0 | −7.1696E−04 0 | −7.6093E−05 0 |
| S212 | 196.5748 | −3.5260E−02 5.6650E−05 | −2.3773E−02 0 | 1.1229E−02 0 | 3.1610E−03 0 | −4.6242E−04 0 | −3.4735E−04 0 |
| S213 | −2.099871 | −1.1805E−01 9.9210E−05 | 3.8600E−02 0 | −1.0134E−02 0 | 3.1070E−04 0 | 1.1090E−03 0 | −5.8650E−04 0 |
| S214 | −7.217332 | 4.1566E−02 2.3700E−04 | −8.8390E−02 0 | 4.2417E−02 0 | −1.6768E−02 0 | 6.3890E−03 0 | −1.7846E−03 0 |
| S215 | −1.000027 | 2.3287E−01 5.1690E−04 | −1.0349E−01 0 | 7.3124E−02 0 | −1.2419E−03 0 | −5.3408E−03 0 | −1.4568E−03 0 |
| S216 | −39.33204 | −1.5093E−01 2.7110E−04 | 1.4420E−01 0 | −3.3963E−02 0 | 5.4170E−03 0 | −1.0227E−03 0 | −9.5227E−04 0 |

Table 6 shows the parameters and condition values for conditions (1)-(12) in accordance with the second embodiment of the invention. It can be seen from Table 6 that the lens assembly 2 of the second embodiment satisfies the conditions (1)-(12).

TABLE 6

| SD1 | 1.09 mm | SD2 | 3.42 mm | SD3 | 3.23 mm |
|---|---|---|---|---|---|
| SD4 | 3.08 mm | SD5 | 3.11 mm | MT | 3.1 mm |
| L | 2.39 mm | ALD | 13.93 mm | | |
| $f_1$/L1T | −8.86471 | SD5/TTL | 0.311623 | TTL/SD1 | 9.155963 |
| MT/L1T | 3.690476 | MT/(SD2 + SD3 + SD4 + SD5) | 0.241433 | TTL/L | 4.175732 |
| f/L | 1.068448 | $R_{11}$/L1T | −8.95066 | SD1/L1T | 1.297619 |
| ALD/f | 5.455065 | f/L1T | 3.039988 | | |

Figure 4A:
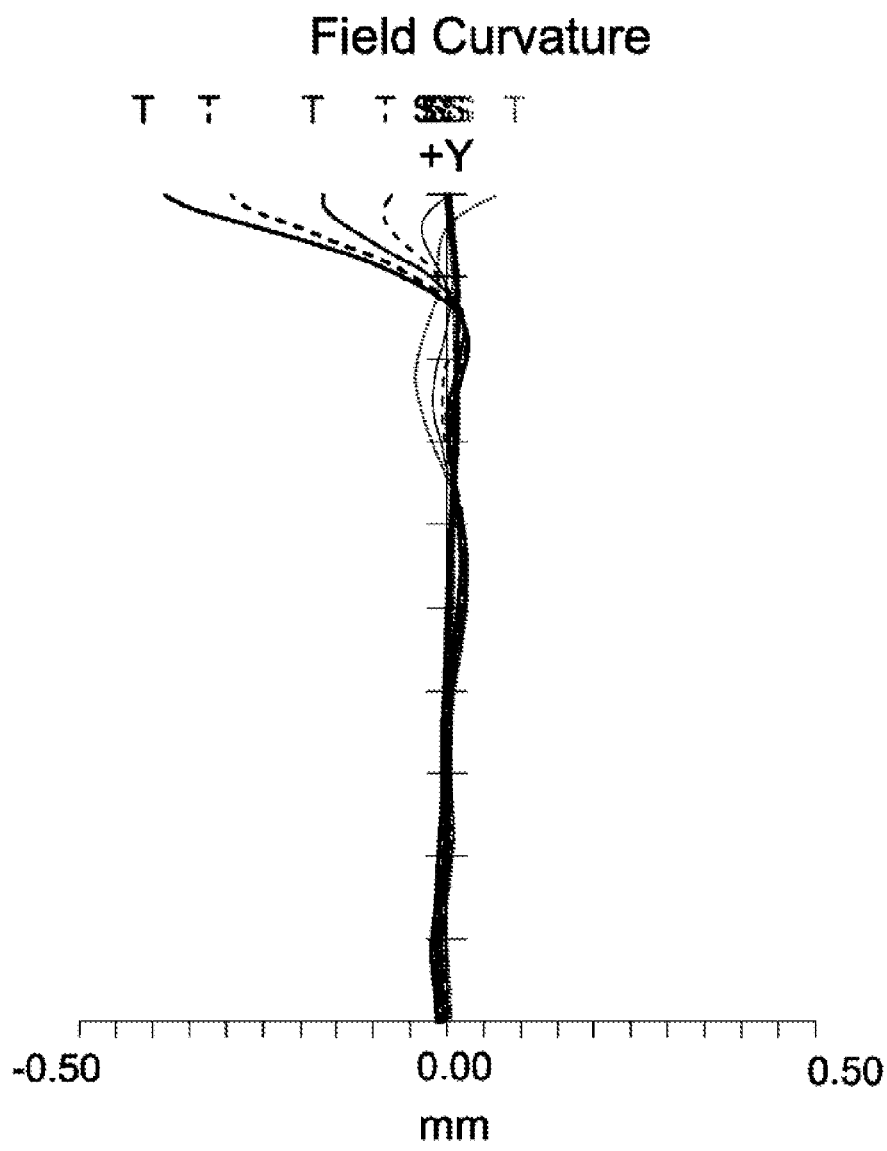
FIG. 4A, FIG. 4B, and FIG. 4C depict a field curvature diagram, a distortion diagram, and a modulation transfer function diagram of the lens assembly respectively in accordance with the second embodiment of the invention.
Figure 4B:
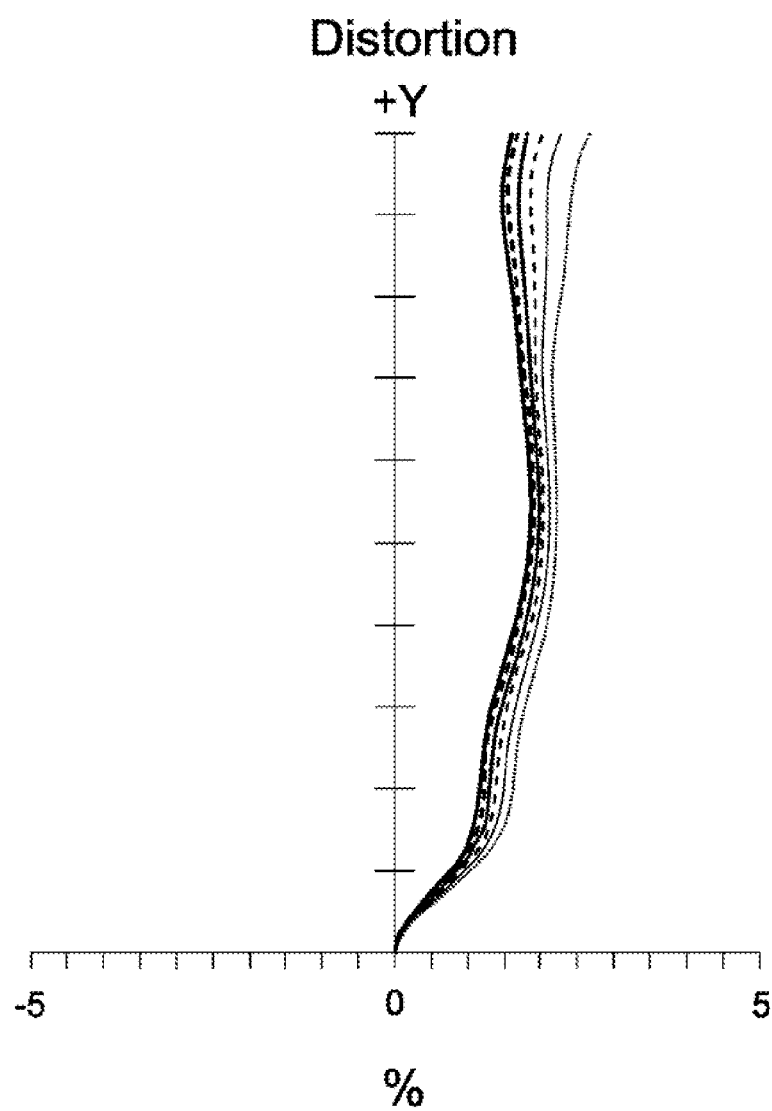
Figure 4C:
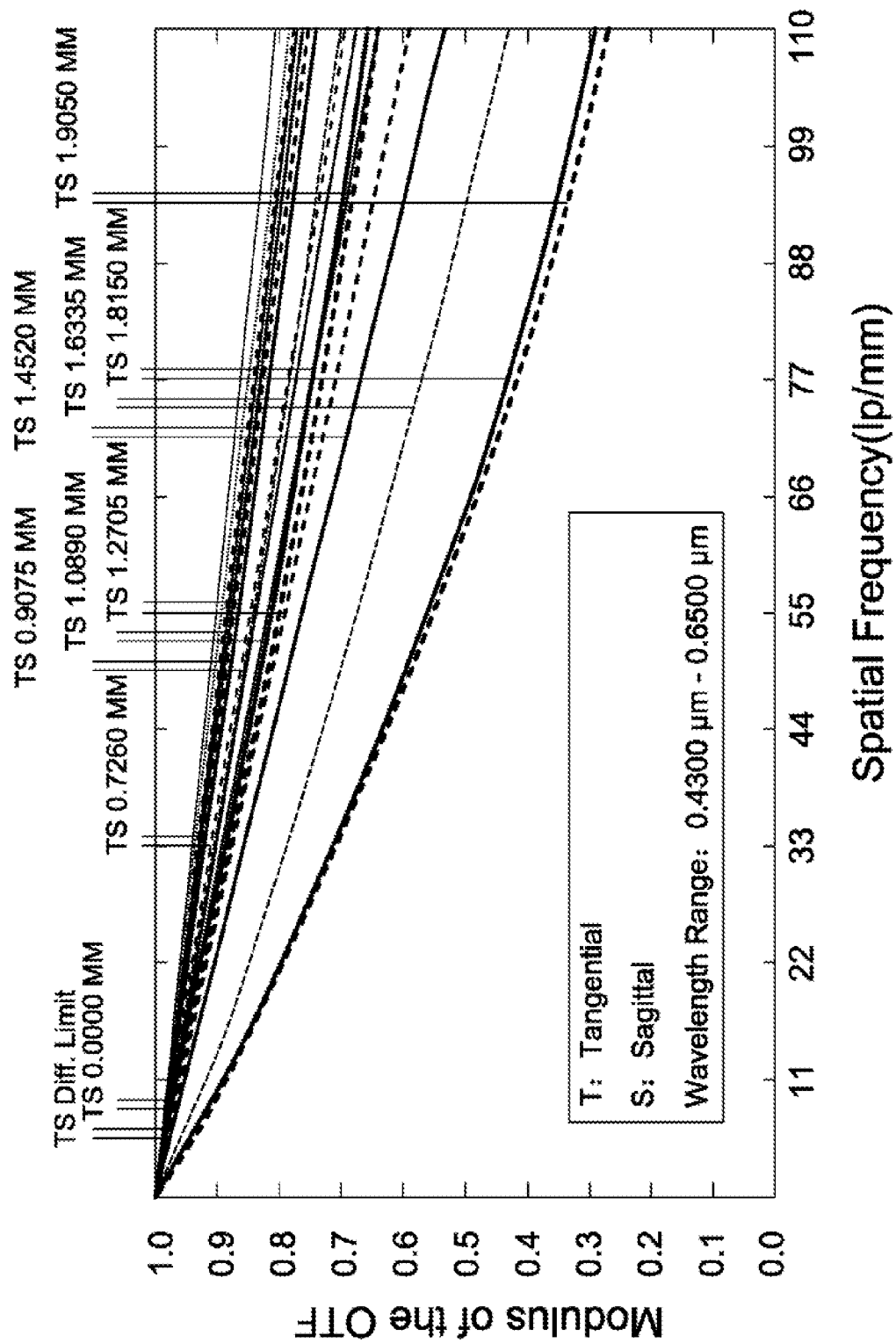

In addition, the lens assembly 2 of the second embodiment can meet the requirements of optical performance as seen in FIGS. 4A-4C. It can be seen from FIG. 4A that the field curvature of tangential direction and sagittal direction in the lens assembly 2 of the second embodiment ranges from −0.4 mm to 0.1 mm. It can be seen from FIG. 4B that the distortion in the lens assembly 2 of the second embodiment ranges from 0% to 3%. It can be seen from FIG. 4C that the modulation transfer function of tangential direction and sagittal direction in the lens assembly 2 of the second embodiment ranges from 0.27 to 1.0. It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
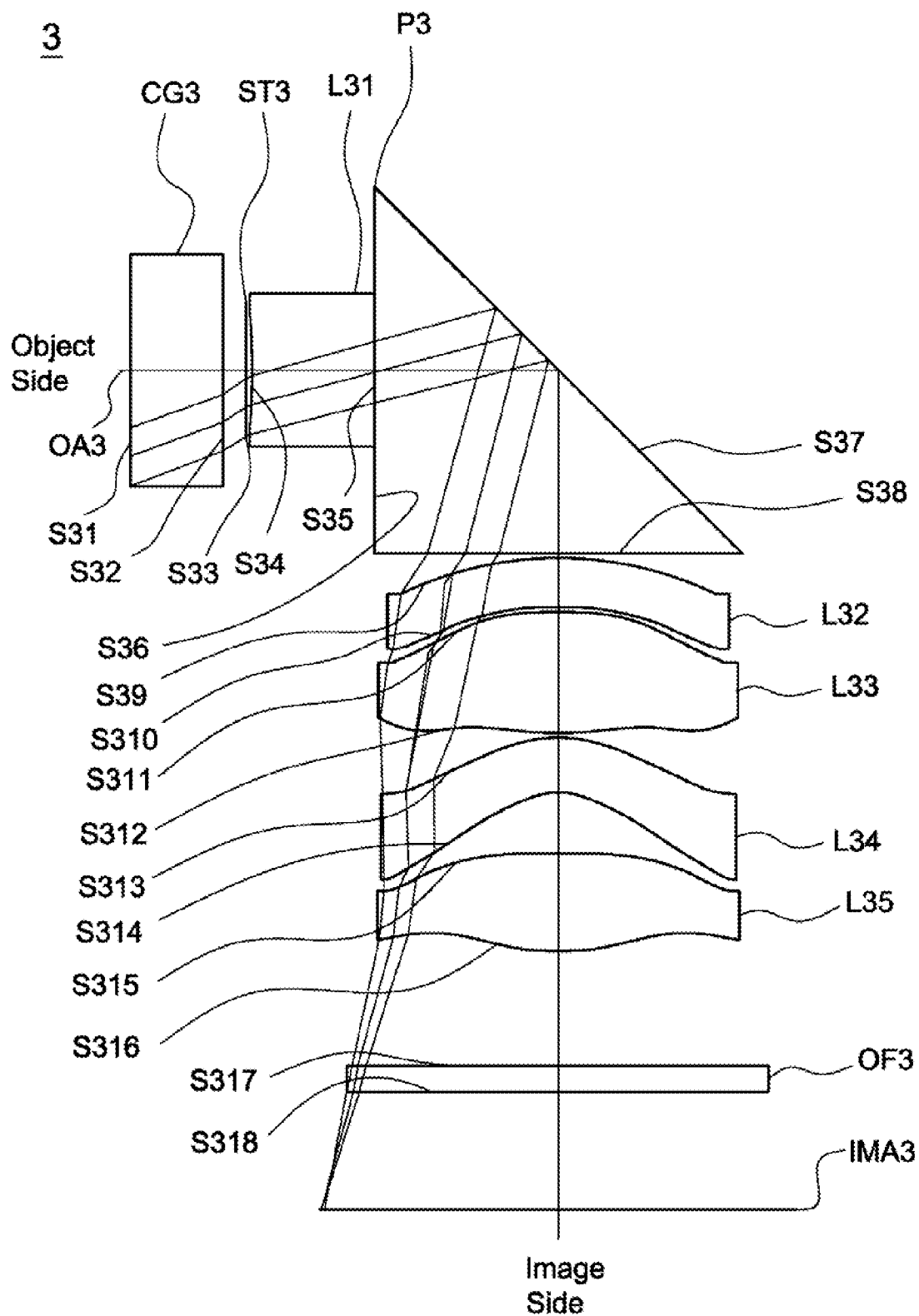
FIG. 5 is a lens layout and optical path diagram of a lens assembly in accordance with a third embodiment of the invention.

Referring to FIG. 5, the lens assembly 3 includes a cover glass CG3, a stop ST3, a first lens L31, a reflective element P3, a second lens L32, a third lens L33, a fourth lens L34, a fifth lens L35, and an optical filter OF3, all of which are arranged in order from an object side to an image side along an axis OA3. The reflective element P3 includes an incident surface S36, a reflective surface S37, and an exit surface S38, wherein the incident surface S36 and the exit surface S38 are perpendicular to each other. In operation, the light from the object side is reflected by the reflective surface S37 to change the propagation direction and imaged on an image plane IMA3. The image plane IMA3 and the exit surface S38 are parallel to each other. In the third embodiment, the reflective element takes a prism as an example but is not limited thereto. For example, the reflective element may be a reflective mirror which only includes a reflective surface.

According to the foregoing, wherein: both of the object side surface S31 and image side surface S32 of the cover glass CG3 are plane surfaces; the first lens L31 is a plane-concave lens, wherein the image side surface S35 is a plane surface and the object side surface S34 is an aspheric surface; the second lens L32 is a meniscus lens, wherein the image side surface S310 is a concave surface; the third lens L33 is a biconvex lens, wherein the image side surface S312 is a convex surface; the fourth lens L34 is a meniscus lens, wherein the object side surface S313 is a convex surface and the image side surface S314 is a concave surface; the fifth lens L35 is a biconvex lens, wherein the object side surface S315 is a convex surface; and both of the object side surface S317 and image side surface S318 of the optical filter OF3 are plane surfaces.

With the above design of the lenses, stop ST3, reflective element P3, and at least any one of the conditions (1)-(12) satisfied, the lens assembly 3 can have an effective shortened total lens length, an effective decreased outer diameter, an effective increased resolution, an effective corrected aberration, an effective corrected chromatic aberration, and is capable of an easy manufacture process.

Table 7 shows the optical specification of the lens assembly 3 in FIG. 5.

TABLE 7

Effective Focal Length = 3 mm F-number = 2.8
Total Lens Length = 10.37 mm Field of View = 65 degrees

| Surface Number | Radius of Curvature (mm) | Thickness (mm) | Nd | Vd | Effective Focal Length (mm) | Remark |
|---|---|---|---|---|---|---|
| S31 | ∞ | 0.75 | 1.5168 | 64.167336 | | CG3 |
| S32 | ∞ | 0.2 | | | | |
| S33 | ∞ | 0.004 | | | | ST3 |
| S34 | −11.21434 | 1 | 2.003303 | 28.319976 | −11.1065 | L31 |
| S35 | ∞ | 0 | | | | |
| S36 | ∞ | 1.5 | 2.003303 | 28.319976 | | P3 Incident Surface |
| S37 | ∞ | 1.5 | 2.003303 | 28.319976 | | P3 Reflective Surface |
| S38 | ∞ | 0.0433509 | | | | P3 Exit Surface |
| S39 | 2.518995 | 0.3999828 | 1.670993 | 19.243508 | 17.9461 | L32 |
| S310 | 2.973444 | 0.0419884 | | | | |
| S311 | 6.997376 | 0.9851131 | 1.5352 | 56.11 | 3.18661 | L33 |
| S312 | −2.153499 | 0.0419915 | | | | |
| S313 | 1.037247 | 0.4499987 | 1.661342 | 20.372904 | −3.38567 | L34 |
| S314 | 0.5874147 | 0.4971176 | | | | |
| S315 | 15.72896 | 0.80001 | 1.5352 | 56.11 | 3.16916 | L35 |
| S316 | −1.87422 | 0.9428598 | | | | |
| S317 | ∞ | 0.21 | 1.5168 | 64.167336 | | OF3 |
| S318 | ∞ | 0.9627068 | | | | |

The definition of aspheric surface sag z of each aspheric lens in table 7 is the same as that of in Table 1, and is not described here again.

In the third embodiment, the conic constant k and the aspheric coefficients A, B, C, D, E, F, G, H, I, J, K, L of each aspheric lens are shown in Table 8.

Figure 6A:
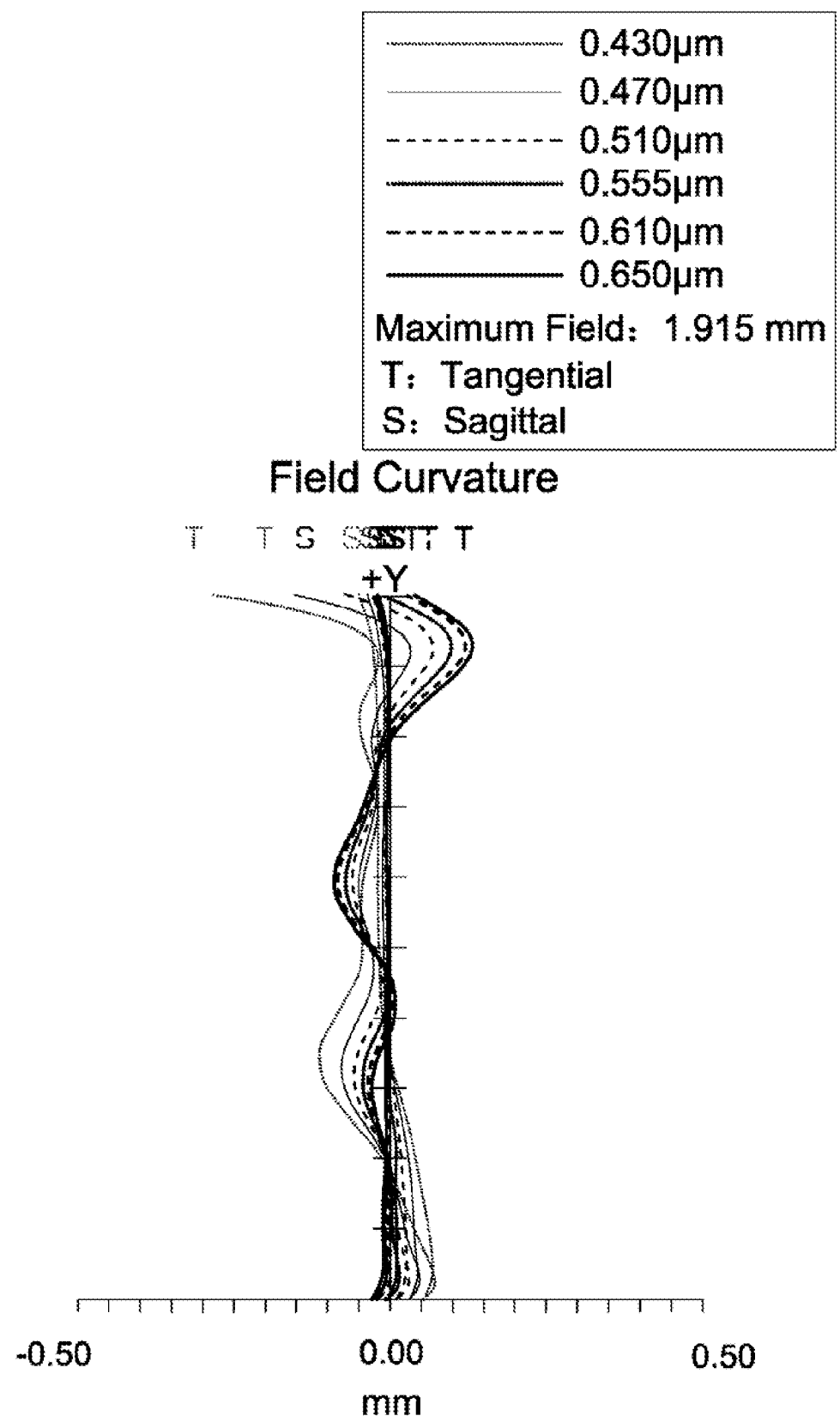
Figure 6B:
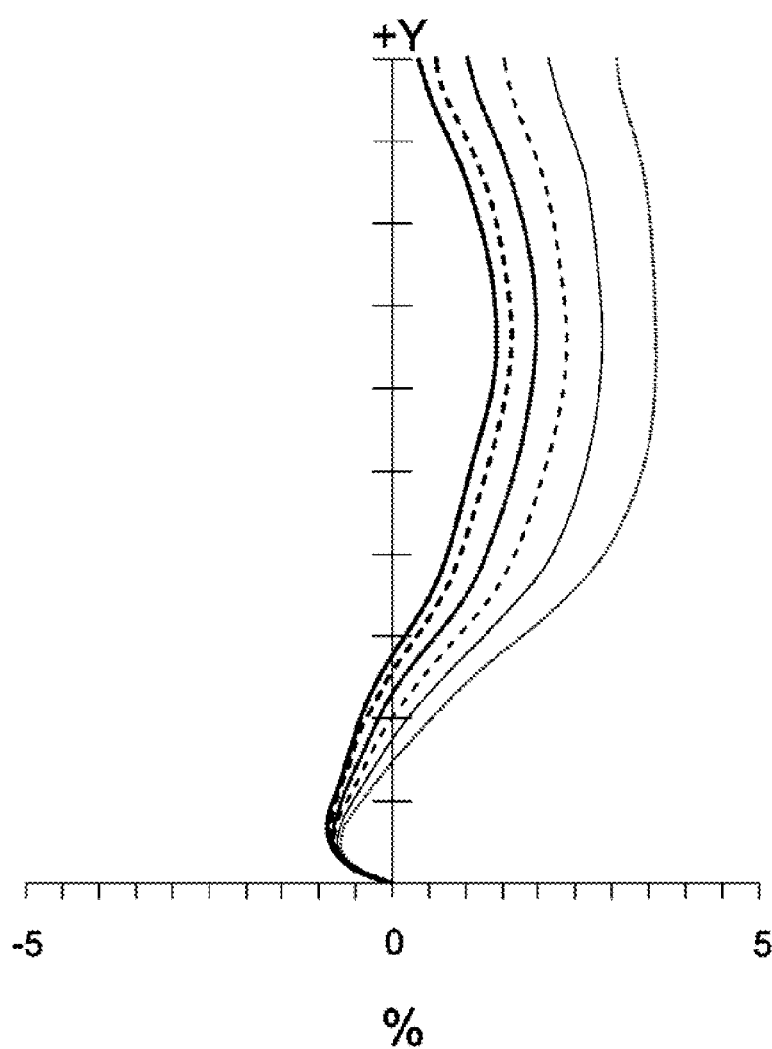

In addition, the lens assembly 3 of the third embodiment can meet the requirements of optical performance as seen in FIGS. 6A-6C. It can be seen from FIG. 6A that the field curvature of tangential direction and sagittal direction in the lens assembly 3 of the third embodiment ranges from −0.3 mm to 0.15 mm. It can be seen from FIG. 6B that the

TABLE 8

| Surface Number | k | A G | B H | C I | D J | E K | F L |
|---|---|---|---|---|---|---|---|
| S34 | −138.6666 | −1.9840E−02 | 1.9963E−01 | −1.4553E+00 | 3.7350E+00 | 2.6108E+00 | −2.5893E+01 |
| | | 2.9984E+01 | 0 | 0 | 0 | 0 | 0 |
| S39 | −12.87667 | 1.7964E−02 | −1.1823E−01 | 8.6661E−02 | 1.4891E−02 | −3.4462E−02 | −9.0718E−04 |
| | | 1.0998E−02 | −4.3436E−03 | 7.2260E−04 | 1.4711E−02 | −4.1432E−02 | 1.7803E−02 |
| S310 | −28.27857 | −6.8919E−02 | 3.3268E−02 | 2.7418E−02 | 1.4071E−02 | −9.0591E−03 | −1.0561E−02 |
| | | −3.9596E−03 | 8.2680E−03 | −2.0196E−03 | −1.0718E−02 | −1.2483E−01 | 4.3886E−02 |
| S311 | 22.26557 | −2.3175E−01 | 9.5566E−02 | −2.9471E−04 | −6.2191E−02 | 2.9120E−03 | 1.7516E−02 |
| | | 5.7870E−03 | −1.1111E−02 | 2.9140E−03 | −7.4692E−02 | 1.4421E−02 | 7.9804E−02 |
| S312 | 0.8729461 | −3.6232E−01 | 6.0449E−02 | −1.5904E−02 | 1.4409E−02 | 4.9020E−03 | −3.2073E−03 |
| | | −2.8463E−03 | 1.5530E−03 | −1.9476E−04 | −7.0472E−02 | 1.5231E−01 | −1.9737E−02 |
| S313 | −2.594954 | 1.2251E−01 | −2.3435E−02 | 2.2612E−02 | −1.5037E−02 | −7.0001E−03 | 8.1720E−03 |
| | | 4.9770E−03 | −5.7978E−03 | 1.2750E−03 | 2.3100E−03 | −1.0014E−01 | 3.0803E−02 |
| S314 | −3.060501 | −3.6878E−01 | 1.8270E−01 | −1.2540E−01 | 1.1575E−01 | 4.4544E−02 | −5.0402E−03 |
| | | −1.8848E−02 | 9.6580E−03 | −1.3917E−03 | 9.5603E−02 | 2.3883E−01 | −7.4220E−02 |
| S315 | 112.0945 | −1.4760E−01 | 1.0645E−01 | 8.1370E−03 | −4.8291E−02 | −7.8726E−03 | 1.8660E−03 |
| | | 1.6575E−02 | −1.0499E−02 | 1.9420E−03 | 5.0025E−02 | −1.7883E−01 | 1.0793E−01 |
| S316 | 0 | −3.4445E−01 | −3.6371E−01 | 1.7706E−01 | −6.1844E−02 | 9.7980E−03 | −6.0883E−03 |
| | | 6.4610E−03 | −2.2497E−03 | 2.3980E−04 | 7.2743E−02 | 3.7552E−01 | −3.1586E−03 |

Table 9 shows the parameters and condition values for conditions (1)-(12) in accordance with the third embodiment of the invention. It can be seen from Table 9 that the lens assembly 3 of the third embodiment satisfies the conditions (1)-(12).

distortion in the lens assembly 3 of the third embodiment ranges from −1% to 4%. It can be seen from FIG. 6C that the modulation transfer function of tangential direction and sagittal direction in the lens assembly 3 of the third embodiment ranges from 0.17 to 1.0. It is obvious that the field

TABLE 9

| | | | | | |
|---|---|---|---|---|---|
| SD1 | 1.25 mm | SD2 | 2.79 mm | SD3 | 2.94 mm |
| SD4 | 2.89 mm | SD5 | 2.95 mm | MT | 3 mm |
| L | 2.5 mm | ALD | 12.82 mm | | |
| $f_1$/L1T | −11.1065 | SD5/TTL | 0.284474 | TTL/SD1 | 8.296 |
| MT/L1T | 3 | MT/(SD2 + SD3 + SD4 + SD5) | 0.259291 | TTL/L | 4.148 |
| f/L | 1.2 | $R_{11}$/L1T | −11.2143 | SD1/L1T | 1.25 |
| ALD/f | 4.273333 | f/L1T | 3 | | | curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
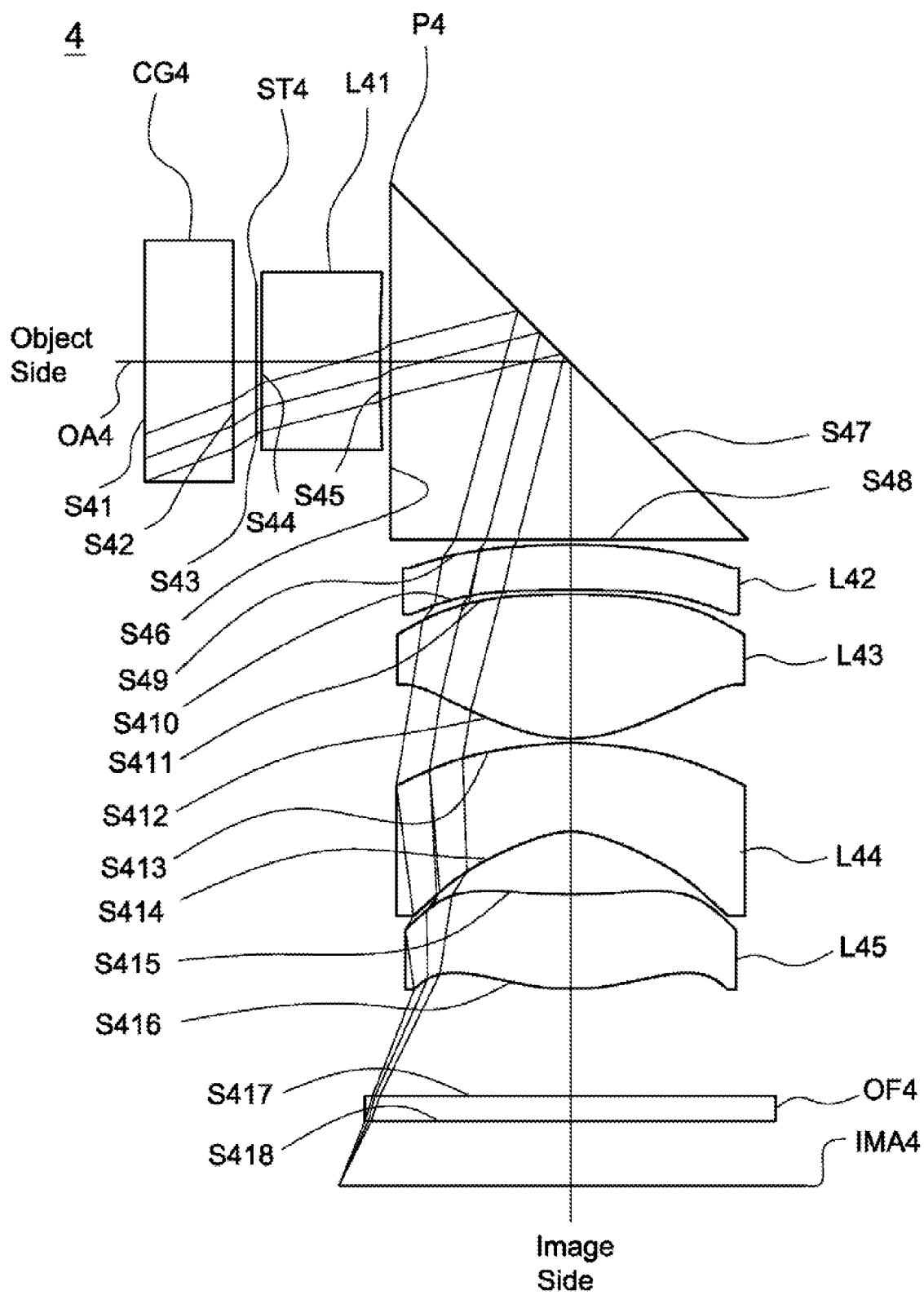
FIG. 7 is a lens layout and optical path diagram of a lens assembly in accordance with a fourth embodiment of the invention.

Referring to FIG. 7, the lens assembly 4 includes a cover glass CG4, a stop ST4, a first lens L41, a reflective element P4, a second lens L42, a third lens L43, a fourth lens L44, a fifth lens L45, and an optical filter OF4, all of which are arranged in order from an object side to an image side along an axis OA4. The reflective element P4 includes an incident surface S46, a reflective surface S47, and an exit surface S48, wherein the incident surface S46 and the exit surface S48 are perpendicular to each other. In operation, the light from the object side is reflected by the reflective surface S47 to change the propagation direction and imaged on an image plane IMA4. The image plane IMA4 and the exit surface S48 are parallel to each other. In the fourth embodiment, the reflective element takes a prism as an example but is not limited thereto. For example, the reflective element may be a reflective mirror which only includes a reflective surface.

second lens L42 is a meniscus lens, wherein the image side surface S410 is a concave surface; the third lens L43 is a biconvex lens, wherein the image side surface S412 is a convex surface; the fourth lens L44 is a meniscus lens, wherein the object side surface S413 is a convex surface and the image side surface S414 is a concave surface; the fifth lens L45 is a meniscus lens, wherein the object side surface S415 is a concave surface; and both of the object side surface S417 and image side surface S418 of the optical filter OF4 are plane surfaces.

With the above design of the lenses, stop ST4, reflective element P4, and at least any one of the conditions (1)-(12) satisfied, the lens assembly 4 can have an effective shortened total lens length, an effective decreased outer diameter, an effective increased resolution, an effective corrected aberration, an effective corrected chromatic aberration, and is capable of an easy manufacture process.

Table 10 shows the optical specification of the lens assembly 4 in FIG. 7.

TABLE 10

Effective Focal Length = 3.02565 mm F-number = 2.48
Total Lens Length = 10.5536 mm Field of View = 64 degrees

| Surface Number | Radius of Curvature (mm) | Thickness (mm) | Nd | Vd | Effective Focal Length (mm) | Remark |
|---|---|---|---|---|---|---|
| S41 | ∞ | 0.75 | 1.5168 | 64.167336 | | CG4 |
| S42 | ∞ | 0.2 | | | | |
| S43 | ∞ | 0.04 | | | | ST4 |
| S44 | −18.41896 | 1 | 2.003303 | 28.319976 | −8.06672 | L41 |
| S45 | 15.00066 | 0.1 | | | | |
| S46 | ∞ | 1.5 | 2.003303 | 28.319976 | | P4 Incident Surface |
| S47 | ∞ | 1.5 | 2.003303 | 28.319976 | | P4 Reflective Surface |
| S48 | ∞ | 0.05 | | | | P4 Exit Surface |
| S49 | 6.270589 | 0.3865494 | 1.670993 | 19.243508 | 22.5545 | L42 |
| S410 | 10.36936 | 0.0329088 | | | | |
| S411 | 6.004653 | 1.216863 | 1.5352 | 56.11 | 1.93727 | L43 |
| S412 | −1.169108 | 0.035656 | | | | |
| S413 | 2.130272 | 0.752001 | 1.661342 | 20.372904 | −1.95201 | L44 |
| S414 | 0.694021 | 0.5252105 | | | | |
| S415 | −6.392578 | 0.8021414 | 1.5352 | 56.11 | 5.04751 | L45 |
| S416 | −1.986759 | 0.906555 | | | | |
| S417 | ∞ | 0.21 | 1.5168 | 64.167336 | | OF4 |
| S418 | ∞ | 0.5457508 | | | | |

According to the foregoin, wherein: both of the object side surface S41 and image side surface S42 of the cover glass CG4 are plane surfaces; the first lens L41 is a biconcave lens, wherein the image side surface S45 is a concave surface, the object side surface S44 is an aspheric surface, and the image side surface S45 is a spherical surface; the The definition of aspheric surface sag z of each aspheric lens in table 10 is the same as that of in Table 1, and is not described here again.

In the fourth embodiment, the conic constant k and the aspheric coefficients A, B, C, D, E, F, G, H, I, J, K, L of each aspheric lens are shown in Table 11.

TABLE 11

| Surface Number | k | A G | B H | C I | D J | E K | F L |
|---|---|---|---|---|---|---|---|
| S44 | −250.5742 | −6.3450E−03 | −6.1310E−03 | −2.8135E−01 | 2.1338E+00 | −6.5710E+00 | 9.3273E+00 |
| | | −4.9263E+00 | 0 | 0 | 0 | 0 | 0 |
| S49 | 9.779996 | 2.9625E−02 | −1.4478E−01 | 4.9697E−02 | 2.1210E−02 | −5.6629E−03 | −1.2056E−02 |
| | | 5.5020E−03 | 3.5720E−05 | −2.2394E−04 | 9.4550E−03 | 3.9876E−02 | 1.4460E−04 |
| S410 | 6.996649 | 6.6154E−02 | 8.3783E−02 | −4.6399E−02 | −3.6966E−03 | 1.8047E−02 | −7.4787E−04 |
| | | −8.7826E−03 | 4.5230E−02 | −6.8563E−04 | 4.1806E−02 | −2.3781E−01 | 5.4746E−02 |
| S411 | −41.39938 | −1.4690E−01 | 1.4950E−02 | 1.0397E−02 | −6.2427E−02 | 6.2360E−03 | 1.6202E−02 |
| | | −4.5689E−03 | −1.1134E−03 | 4.2480E−04 | 6.1835E−02 | −1.8995E−02 | 7.6550E−02 |
| S412 | −0.5172243 | −4.2784E−01 | 6.4517E−02 | −2.8731E−02 | 1.0820E−02 | 2.8240E−03 | −3.3368E−03 |
| | | −1.9001E−03 | 1.8360E−03 | −3.3848E−04 | 6.1870E−02 | 2.0905E−01 | −5.0095E−02 |
| S413 | −0.1859317 | 1.2874E−01 | −1.1484E−01 | 4.7384E−02 | 1.0932E−02 | −2.3375E−02 | 8.0380E−03 |
| | | 1.6350E−03 | −1.4632E−03 | 2.2640E−04 | 3.4221E−02 | −1.0974E−02 | 7.2770E−04 |

TABLE 11-continued

| Surface Number | k | A<br>G | B<br>H | C<br>I | D<br>J | E<br>K | F<br>L |
|---|---|---|---|---|---|---|---|
| S414 | −3.11992 | 3.2841E−01<br>−2.1357E−02 | 1.7417E−01<br>6.9430E−03 | −7.9922E−02<br>−6.2412E−04 | −5.1778E−02<br>−1.2247E−02 | 5.0710E−02<br>−5.0175E−01 | 9.3620E−03<br>9.8646E−02 |
| S415 | 17.23926 | −9.0582E−02<br>−3.6004E−02 | 2.9264E−02<br>1.4723E−02 | −3.1648E−02<br>−1.9936E−03 | −3.7874E−02<br>2.7770E−02 | 5.1248E−02<br>−1.5815E−02 | 1.6746E−02<br>−3.6162E−02 |
| S416 | 0 | −1.9250E−01<br>1.0899E−02 | −6.6542E−02<br>−1.0281E−02 | 1.1020E−01<br>2.4550E−03 | −5.8663E−02<br>2.7378E−02 | 1.5858E−02<br>1.1183E−01 | −2.2353E−04<br>−9.0166E−02 |

Table 12 shows the parameters and condition values for conditions (1)-(12) in accordance with the fourth embodiment of the invention. It can be seen from Table 12 that the lens assembly 4 of the fourth embodiment satisfies the conditions (1)-(12).

TABLE 12

| SD1 | 1.519168 mm | SD2 | 2.831159 mm | SD3 | 2.913121 mm |
|---|---|---|---|---|---|
| SD4 | 2.925538 mm | SD5 | 2.642572 mm | MT | 3 mm |
| L | 2.6 mm | ALD | 12.83156 mm | | |
| $f_1$/L1T | −8.06672 | SD5/TTL | 0.250395 | TTL/SD1 | 6.94696 |
| MT/L1T | 3 | MT/(SD2 + SD3 + SD4 + SD5) | 0.265196 | TTL/L | 4.059077 |
| f/L | 1.163712 | $R_{11}$/L1T | −18.419 | SD1/L1T | 1.519168 |
| ALD/f | 4.240926 | f/L1T | 3.02565 | | |

Figure 8A:
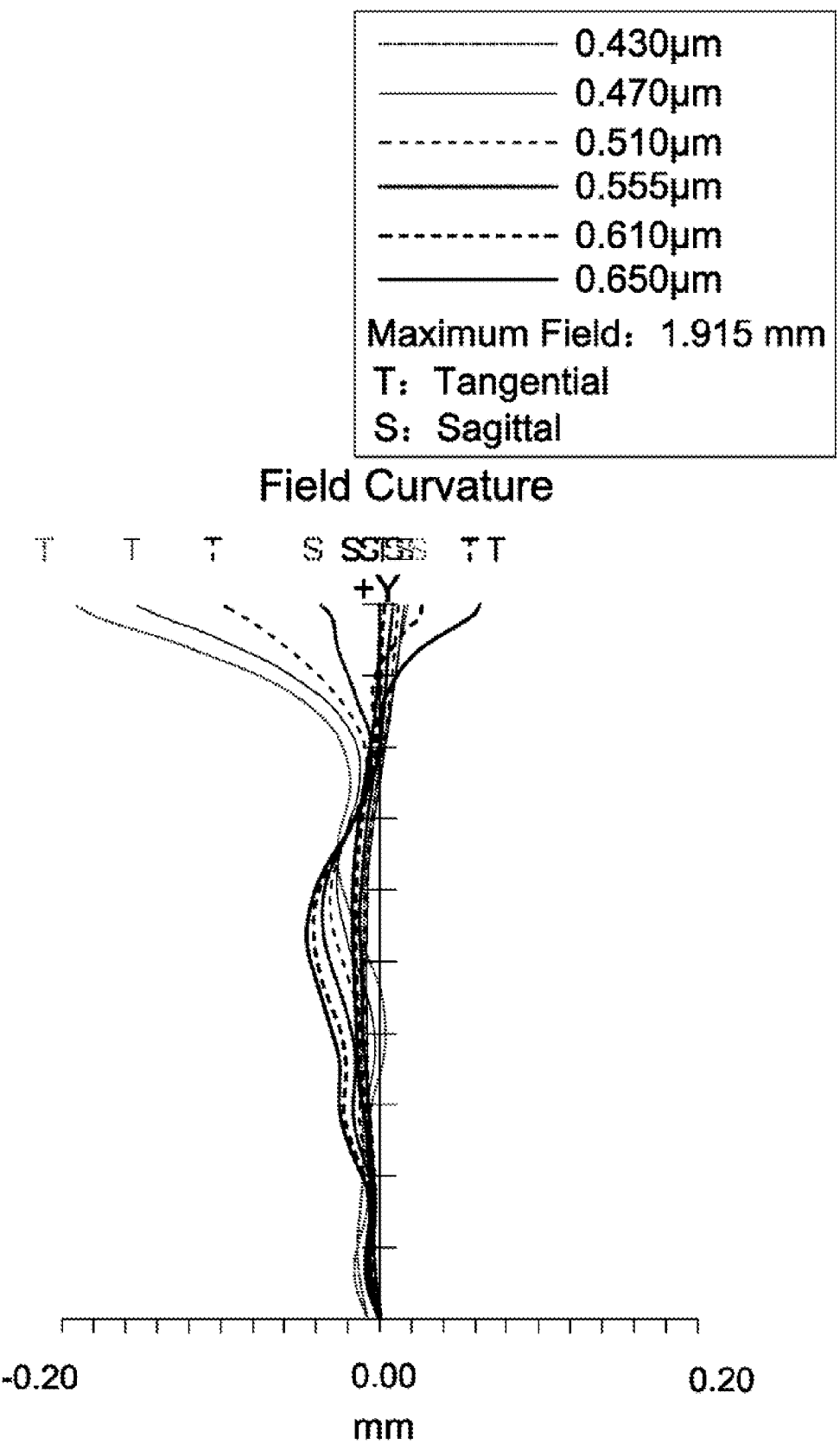
FIG. 8A, FIG. 8B, and FIG. 8C depict a field curvature diagram, a distortion diagram, and a modulation transfer function diagram of the lens assembly respectively in accordance with the fourth embodiment of the invention.
Figure 8B:
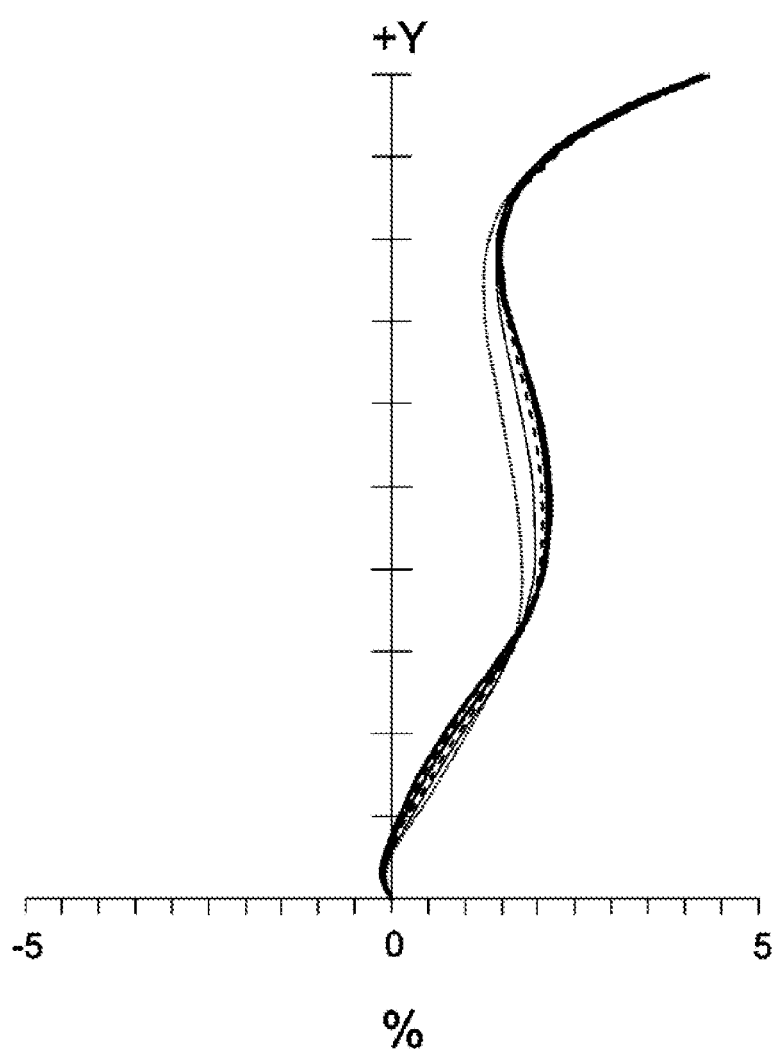
Figure 8C:
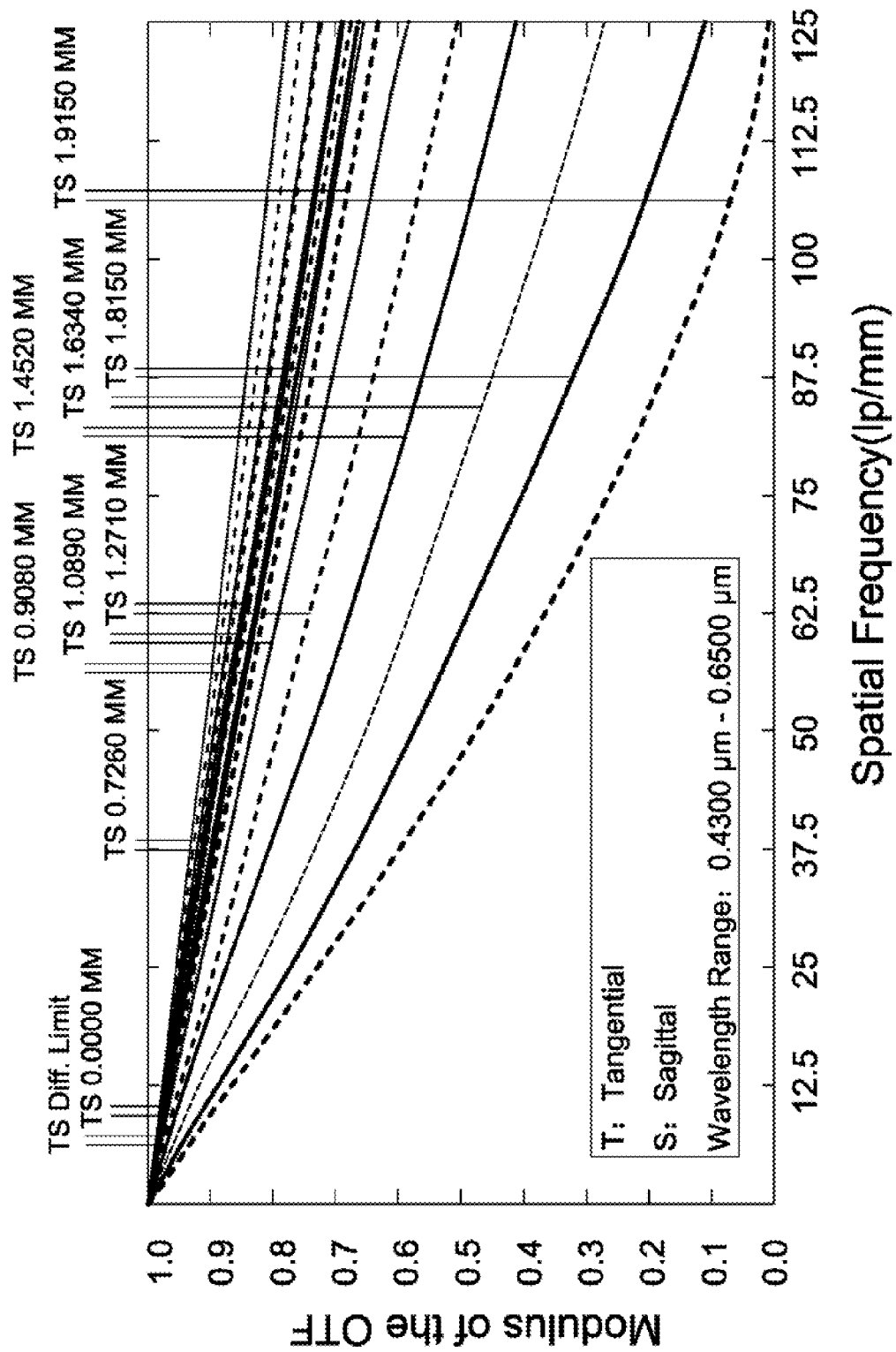

In addition, the lens assembly 4 of the fourth embodiment can meet the requirements of optical performance as seen in FIGS. 8A-8C. It can be seen from FIG. 8A that the field curvature of tangential direction and sagittal direction in the lens assembly 4 of the fourth embodiment ranges from −0.2 mm to 0.08 mm. It can be seen from FIG. 8B that the distortion in the lens assembly 4 of the fourth embodiment ranges from −0.1% to 1.8%. It can be seen from FIG. 8C that the modulation transfer function of tangential direction and sagittal direction in the lens assembly 4 of the fourth embodiment ranges from 0.01 to 1.0. It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

Referring to Table 13, Table 14, Table 16, Table 17, Table 19, Table 20, Table 22, and Table 23, wherein Table 13, Table 16, Table 19, and Table 22 show optical specification in accordance with a fifth, sixth, seventh, and eighth embodiments of the invention respectively and Table 14, Table 17, Table 20, and Table 23 show aspheric coefficients of each aspheric lens in Table 13, Table 16, Table 19, and Table 22 respectively. FIG. 9, FIG. 11, FIG. 13, and FIG. 15 are lens layout and optical path diagrams of the lens assemblies in accordance with the fifth, sixth, seventh, and eighth embodiments of the invention respectively.

The first lenses L51, L61, L71, L81 are meniscus lenses with positive refractive power and made of glass material, wherein the object side surfaces S52, S62, S72, S82 are concave surfaces, the image side surfaces S53, S63, S73, S83 are convex surfaces, and both of the object side surfaces S52, S62, S72, S82 and image side surfaces S53, S63, S73, S83 are aspheric surfaces. The object side surfaces S52, S62, S72, S82 are concave at the near optical axis which helps to achieve the design specification requirements such as miniaturization and shortening total lens length.

The reflective elements P5, P6, P7, P8 are made of glass or plastic material, wherein the incident surfaces S54, S64, S74, S84 are plane surfaces, the reflective surfaces S55, S65, S75, S85 are plane surfaces, and the exit surfaces S56, S66, S76, S86 are plane surfaces. The reflective element can also be a prism or a reflective mirror. The reflective element can also only include one reflective surface when the reflective element is a reflective mirror. With the configuration of the reflective element, the total lens length of the lens assembly can be prevented from being too long, which causes excessive occupation of the limited space of the lens assembly and results to poor space utilization, thus reducing the volume of the lens assembly and increasing the space usage.

The second lenses L52, L62, L72, L82 are meniscus lenses with negative refractive power and made of plastic material, wherein the object side surfaces S57, S67, S77, S87 are convex surfaces, the image side surfaces S58, S68, S78, S88 are concave surfaces, and both of the object side surfaces S57, S67, S77, S87 and image side surfaces S58, S68, S78, S88 are aspheric surfaces. The object side surfaces S57, S67, S77, S87 are convex at the near optical axis which makes the light of each field of view entering the lens assembly uniformly and corrects the off-axis image bending phenomenon.

The third lenses L53, L63, L73, L83 are with refractive power and made of plastic material, wherein both of the object side surfaces S59, S69, S79, S89 and image side surfaces S510, S610, S710, S810 are aspheric surfaces.

The fourth lenses L54, L64, L74, L84 are with positive refractive power and made of plastic material, wherein the image side surfaces S512, S612, S712, S812 are convex surfaces and both of the object side surfaces S511, S611, S711, S811 and image side surfaces S512, S612, S712, S812 are aspheric surfaces.

The fifth lenses L55, L65, L75, L85 are meniscus lenses with refractive power and made of plastic material, wherein the object side surfaces S513, S613, S713, S813 are convex surfaces, the image side surfaces S514, S614, S714, S814 are concave surfaces, and both of the object side surfaces S513, S613, S713, S813 and image side surfaces S514, S614, S714, S814 are aspheric surfaces.

In addition, the lens assemblies 5, 6, 7, 8 satisfy at least any one of the conditions (1)-(5) and the following conditions:

$$3<(f_1+f)/SD1<5; \quad (13)$$

$$-6<R_{11}/R_{52}<-0.5; \quad (14)$$

$$1<f_1/L1T<4; \quad (15)$$

$$1 \text{ mm}^2<f_1 \times f_4<11 \text{ mm}^2; \quad (16)$$

$-12 \text{ mm}^2 < f_2 \times f_4 < -1 \text{ mm}^2$; (17)

$0.5 < f_1/L < 2.5$; (18)

wherein $f_1$ is an effective focal length of the first lenses L51, L61, L71, L81 for the fifth to eighth embodiments, $f_2$ is an effective focal length of the second lenses L52, L62, L72, L82 for the fifth to eighth embodiments, $f_4$ is an effective focal length of the fourth lenses L54, L64, L74, L84 for the fifth to eighth embodiments, f is an effective focal length of the lens assemblies 5, 6, 7, 8 for the fifth to eighth embodiments, SD1 is an effective optical diameter of the first lenses L51, L61, L71, L81 for the fifth to eighth embodiments, $R_{11}$ is a radius of curvature of the object side surfaces S52, S62, S72, S82 of the first lenses L51, L61, L71, L81 for the fifth to eighth embodiments, $R_{52}$ is a radius of curvature of the image side surfaces S514, S614, S714, S814 of the fifth lenses L55, L65, L75, L85 for the fifth to eighth embodiments, L1T is a thickness along the axes OA5, OA6, OA7, OA8 of the first lenses L51, L61, L71, L81 for the fifth to eighth embodiments, and L is an interval from the object side surfaces S52, S62, S72, S82 of the first lenses L51, L61, L71, L81 to the reflective surfaces S55, S65, S75, S85 along the axes OA5, OA6, OA7, OA8 respectively for the fifth to eighth embodiments. With the lens assemblies 5, 6, 7, 8 satisfying at least any one of conditions (1)-(5) and (13)-(18), the total lens length can be effectively shortened, the outer diameter can be effectively decreased, the resolution can be effectively increased, the aberration can be effectively corrected, the chromatic aberration can be effectively corrected, and easy to manufacture process.

When the lens assembly satisfies the condition: $3 < (f_1+f)/SD1 < 5$; the volume of the lens assembly can be effectively reduced making the lens assembly more suitable for use in any electronic devices with strict space constraints; when the lens assembly satisfies the condition: 2 mm<L<6 mm; making the lens assembly miniaturization, reduced in volume and having longer effective focal length in order to achieve better optical zoom magnification with multiple lens assemblies; when the lens assembly satisfies the condition: 0.5<MT/L1T<3; the flexibility of the size and configuration of the lens assembly can be effectively improved which is helpful to the requirements for more applications.

Figure 9:
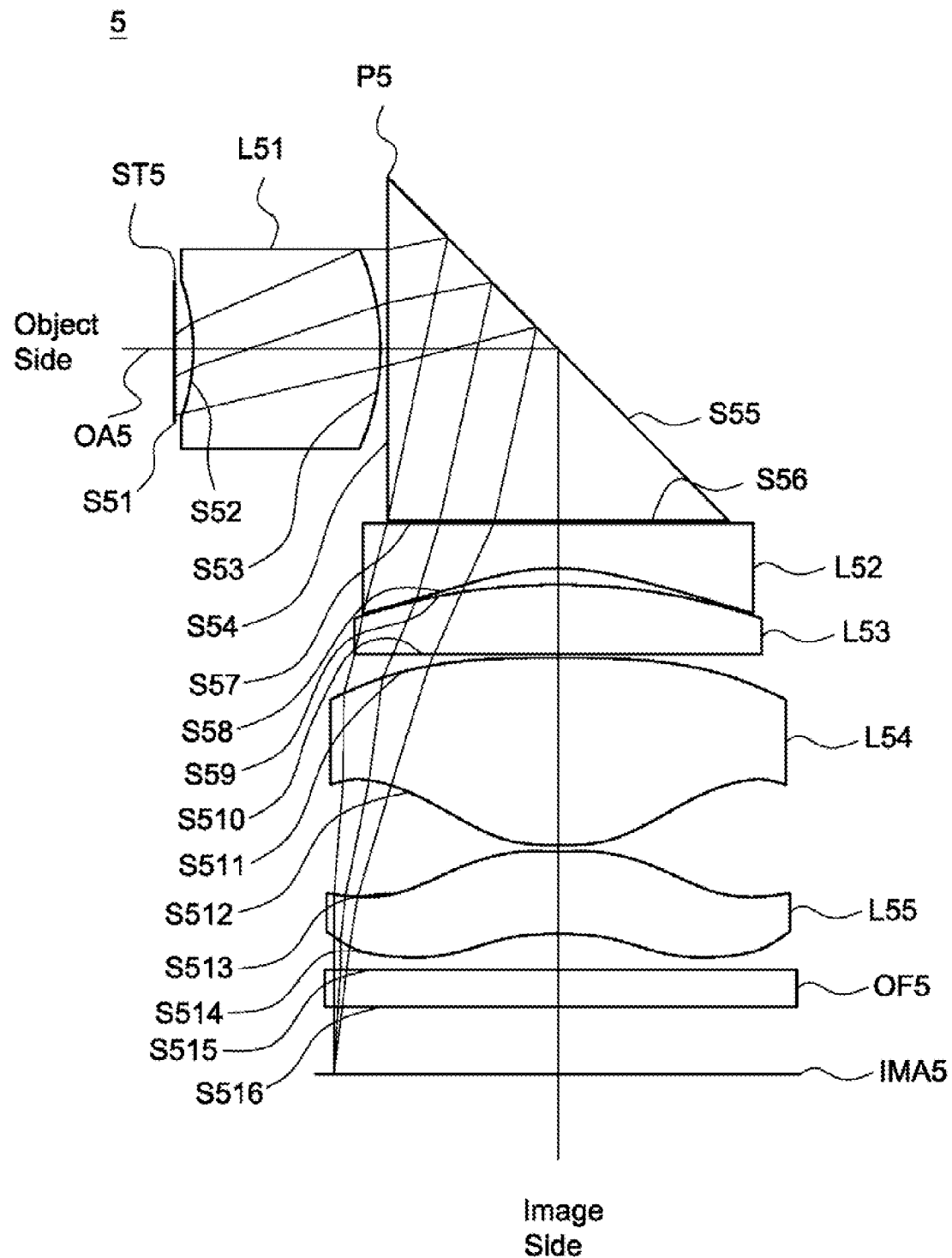
FIG. 9 is a lens layout and optical path diagram of a lens assembly in accordance with a fifth embodiment of the invention.

A detailed description of a lens assembly in accordance with a fifth embodiment of the invention is as follows. Referring to FIG. 9, the lens assembly 5 includes a stop STS, a first lens L51, a reflective element P5, a second lens L52, a third lens L53, a fourth lens L54, a fifth lens L55, and an optical filter OF5, all of which are arranged in order from an object side to an image side along an axis OA5. The incident surface S54 and the exit surface S56 of the reflective element P5 are perpendicular to each other. In operation, the light from the object side is reflected by the reflective surface S55 to change the propagation direction and imaged on an image plane IMA5. The image plane IMA5 and the exit surface S56 are parallel to each other. In the fifth embodiment, the reflective element takes a prism as an example but is not limited thereto. For example, the reflective element may be a reflective mirror which only includes a reflective surface.

According to the foregoing, wherein: the third lens L53 is a biconvex lens with positive refractive power, wherein the object side surface S59 is a convex surface and the image side surface S510 is a convex surface; the fourth lens L54 is a biconvex lens, wherein the object side surface S511 is a convex surface; the fifth lens L55 is with positive refractive power; and both of the object side surface S515 and image side surface S516 of the optical filter OF5 are plane surfaces.

With the above design of the lenses, stop STS, reflective element P5, and at least any one of the conditions (1)-(5) and (13)-(18) satisfied, the lens assembly 5 can have an effective shortened total lens length, an effective decreased outer diameter, an effective increased resolution, an effective corrected aberration, an effective corrected chromatic aberration, and is capable of an easy manufacture process.

Table 13 shows the optical specification of the lens assembly 5 in FIG. 9.

TABLE 13

Effective Focal Length = 1.6347 mm F-number = 2.0
Total Lens Length = 6.400938 mm Field of View = 75.26 degrees

| Surface Number | Radius of Curvature (mm) | Thickness (mm) | Nd | Vd | Effective Focal Length (mm) | Remark |
|---|---|---|---|---|---|---|
| S51 | ∞ | 0.1 | | | | ST5 |
| S52 | −1.77880002 | 1.1 | 1.85 | 40.39 | 2.998 | L51 |
| S53 | −1.351686836 | 0.04 | | | | |
| S54 | ∞ | 1 | 2.00 | 28.3 | | P5 Incident Surface |
| S55 | ∞ | 1 | 2.00 | 28.3 | | P5 Reflective Surface |
| S56 | ∞ | 0.01999562 | | | | P5 Exit Surface |
| S57 | 3.173719659 | 0.26 | 1.67 | 19.2 | −2.464 | L52 |
| S58 | 1.057723759 | 0.08423608 | | | | |
| S59 | 5.909473635 | 0.42610827 | 1.535218308 | 56.11525368 | 9.377 | L53 |
| S510 | −33.17617123 | 0.02224992 | | | | |
| S511 | 31.54136919 | 1.09862244 | 1.535218308 | 56.11525368 | 1.716 | L54 |
| S512 | −0.937323021 | 0.02301784 | | | | |
| S513 | 1.332466318 | 0.48260013 | 1.543915412 | 55.95119807 | 249.557 | L55 |
| S514 | 1.173572191 | 0.23071708 | | | | |
| S515 | ∞ | 0.21 | 1.52 | 64.2 | | OF5 |
| S516 | ∞ | 0.40339097 | | | | |

The definition of aspheric surface sag z of each aspheric lens in table 13 is the same as that of in Table 1, and is not described here again.

In the fifth embodiment, the conic constant k and the aspheric coefficients A, B, C, D, E, F, G, H, I of each aspheric lens are shown in Table 14.

an optical filter OF6, all of which are arranged in order from an object side to an image side along an axis OA6. The incident surface S64 and the exit surface S66 of the reflective element P6 are perpendicular to each other. In operation, the light from the object side is reflected by the reflective

TABLE 14

| Surface Number | k | A G | B H | C I | D | E | F |
|---|---|---|---|---|---|---|---|
| S52 | 15.68352661 | 0.464488883 | −4.012362882 | 92.91652331 | −524.471998 | −2858.462172 | 38745.40497 |
| | | 62766.79267 | −1765418.299 | 5104851.339 | | | |
| S53 | 1.430874291 | 0.034657254 | 1.197885009 | −2.967933715 | −13.84217381 | 41.66332294 | 543.2064416 |
| | | −3302.955219 | 6872.548309 | −5056.412339 | | | |
| S57 | −3.302717611 | 0.55826719 | −0.479902882 | 0.442601714 | −6.670501525 | 24.12627143 | −40.26227771 |
| | | 35.94886556 | −16.66724575 | 3.154577586 | | | |
| S58 | −0.727621971 | 0.65078069 | −0.733150863 | 0.340825453 | 0.138822105 | −0.140852263 | −0.083755223 |
| | | 0.09719398 | 0.007951094 | −0.01754842 | | | |
| S59 | −158.8227357 | −0.41281631 | 0.579459398 | −0.293538362 | −0.112178866 | 0.045763071 | 0.183232674 |
| | | −0.135880286 | 0.019871705 | 0.003615109 | | | |
| S510 | 37.38740692 | 0.001900978 | 0.033026138 | −0.034013539 | −0.007358986 | 0.011090423 | −8.52855E−05 |
| | | −0.00360347 | −0.000985897 | 0.001471122 | | | |
| S511 | 99.75963259 | −0.038743343 | −0.039508846 | −0.004212038 | 0.00774276 | 0.001219095 | −0.00115756 |
| | | 0.001256424 | −0.00164941 | 0.000652034 | | | |
| S512 | −0.620702286 | −0.210427303 | −0.025065675 | −0.097209537 | 0.101777263 | 0.027939378 | −0.052741801 |
| | | −0.02287782 | 0.032925258 | −0.00769524 | | | |
| S513 | −3.134177587 | 0.036221052 | −0.055038998 | 0.014880312 | 0.134142251 | −0.153333409 | 0.061921464 |
| | | 0.008604196 | −0.014466511 | 0.003073816 | | | |
| S514 | −0.874270776 | 0.481276513 | −0.248359459 | 0.044890714 | 0.037379204 | −0.009741386 | −0.006846912 |
| | | 0.001364313 | 0.001267525 | −0.000434347 | | | |

Table 15 shows the parameters and condition values for conditions (1)-(5) and (13)-(18) in accordance with the fifth embodiment of the invention. It can be seen from Table 15 that the lens assembly 5 of the fifth embodiment satisfies the conditions (1)-(5) and (13)-(18).

surface S65 to change the propagation direction and imaged on an image plane IMA6. The image plane IMA6 and the exit surface S66 are parallel to each other. In the sixth embodiment, the reflective element takes a prism as an example but is not limited thereto. For example, the reflec-

TABLE 15

| | | | | | | |
|---|---|---|---|---|---|---|
| SD1 | 1.15 mm | SD2 | 2.28 mm | SD3 | 2.372 mm | |
| SD4 | 2.68 mm | SD5 | 2.694 mm | MT | 2 mm | |
| L | 2.14 mm | | | | | |
| $(f_1 + f)/SD1$ | 4.03 | $R_{11}/R_{S2}$ | −1.52 | $f_1/L1T$ | 2.73 | |
| $R_{11}/L1T$ | −1.62 | MT/(SD2 + SD3 + SD4 + SD5) | 0.20 | TTL/SD1 | 5.57 | |
| MT/L1T | 1.82 | $f_1 \times f_4$ | 5.14 mm² | $f_2 \times f_4$ | −4.23 mm² | |
| $f_1/L$ | 1.40 | | | | | |

Figure 10A:
FIG. 10A, FIG. 10B, and FIG. 10C depict a field curvature diagram, a distortion diagram, and a modulation transfer function diagram of the lens assembly respectively in accordance with the fifth embodiment of the invention.
Figure 10A:
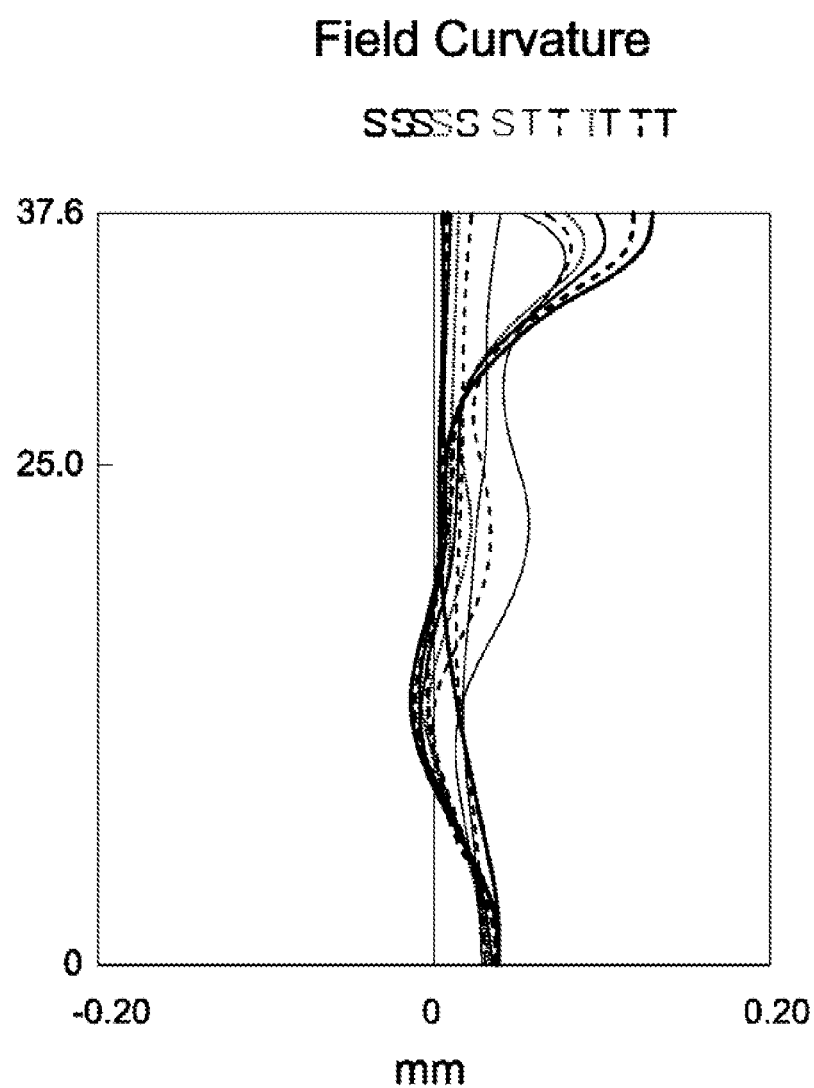
Figure 10B:
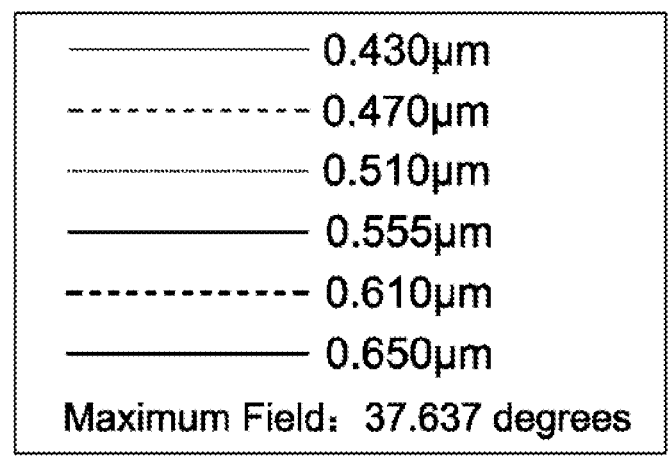
Figure 10B:
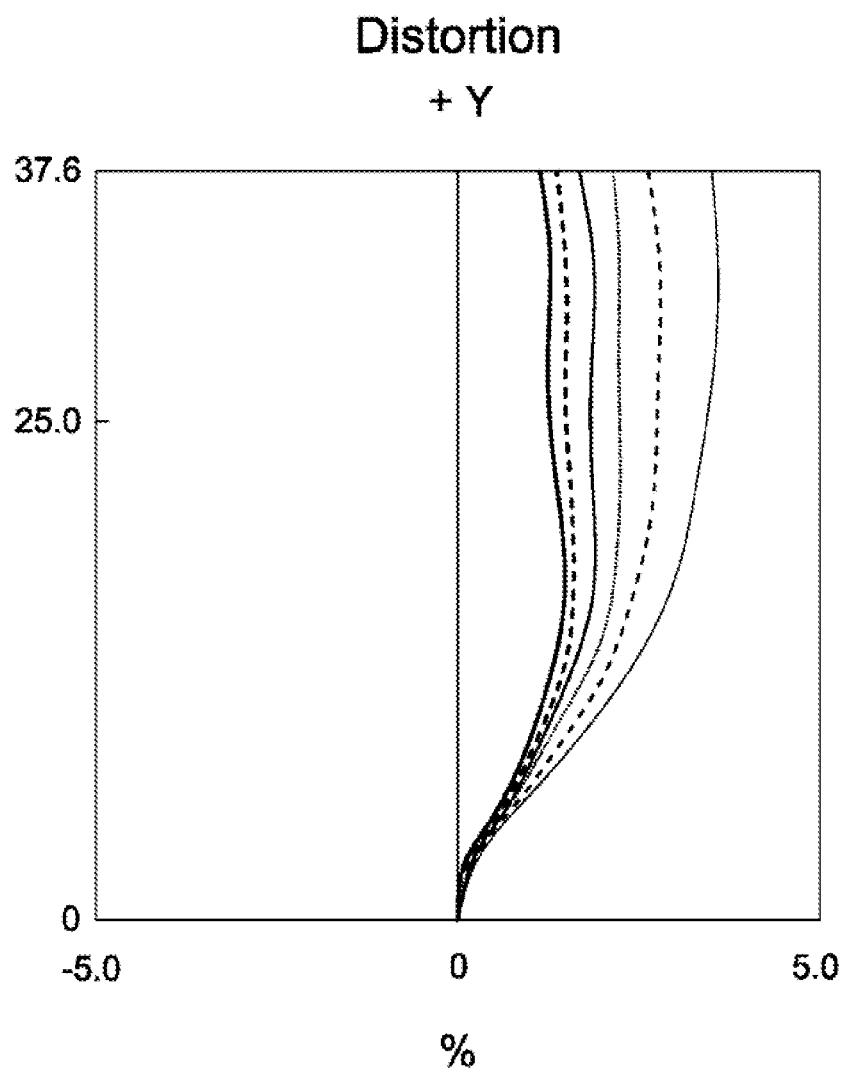
Figure 10C:
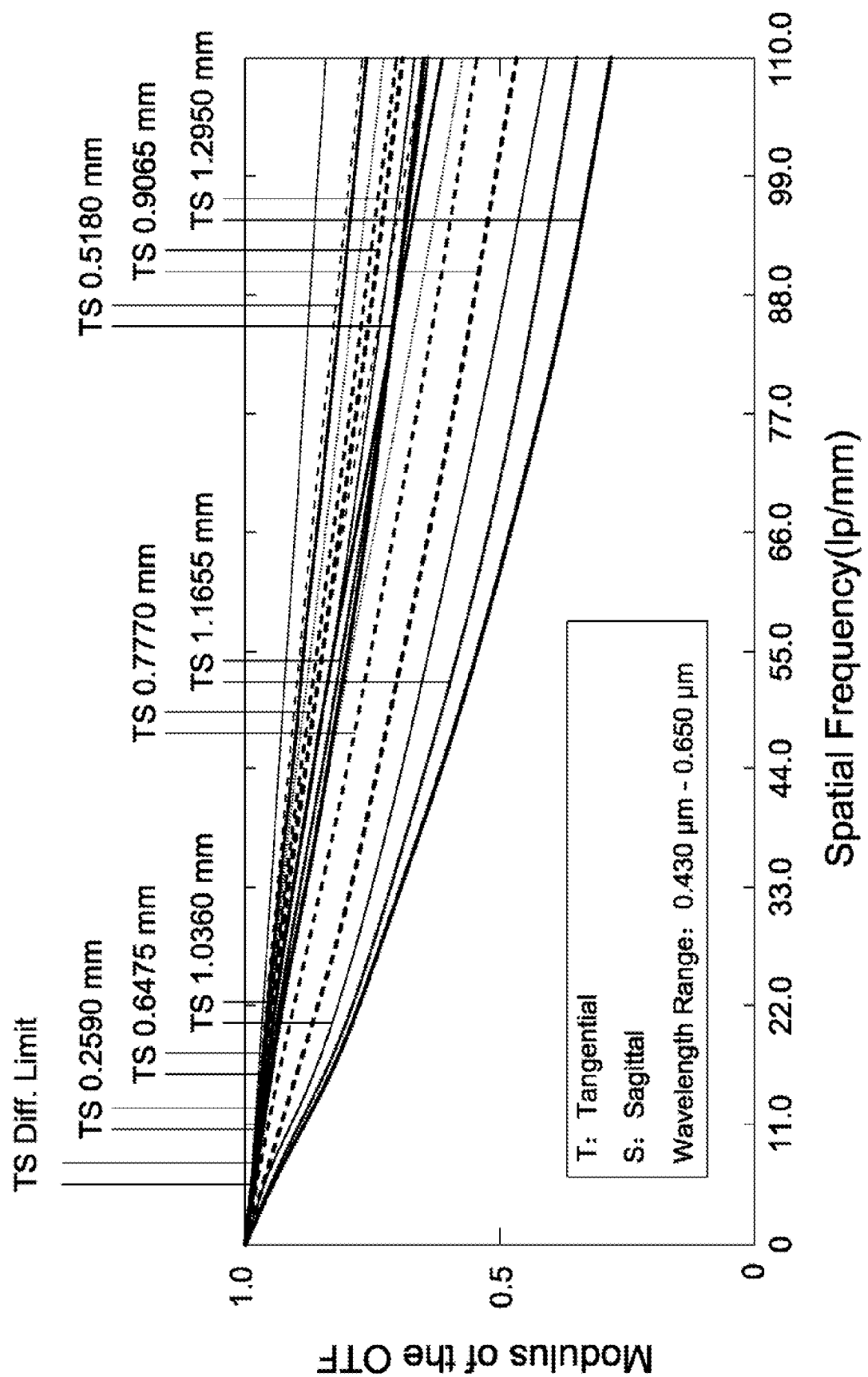

In addition, the lens assembly 5 of the fifth embodiment can meet the requirements of optical performance as seen in FIGS. 10A-10C. It can be seen from FIG. 10A that the field curvature of tangential direction and sagittal direction in the lens assembly 5 of the fifth embodiment ranges from −0.02 mm to 0.14 mm. It can be seen from FIG. 10B that the distortion in the lens assembly 5 of the fifth embodiment ranges from 0% to 4%. It can be seen from FIG. 10C that the modulation transfer function of tangential direction and sagittal direction in the lens assembly 5 of the fifth embodiment ranges from 0.28 to 1.0. It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

Figure 11:
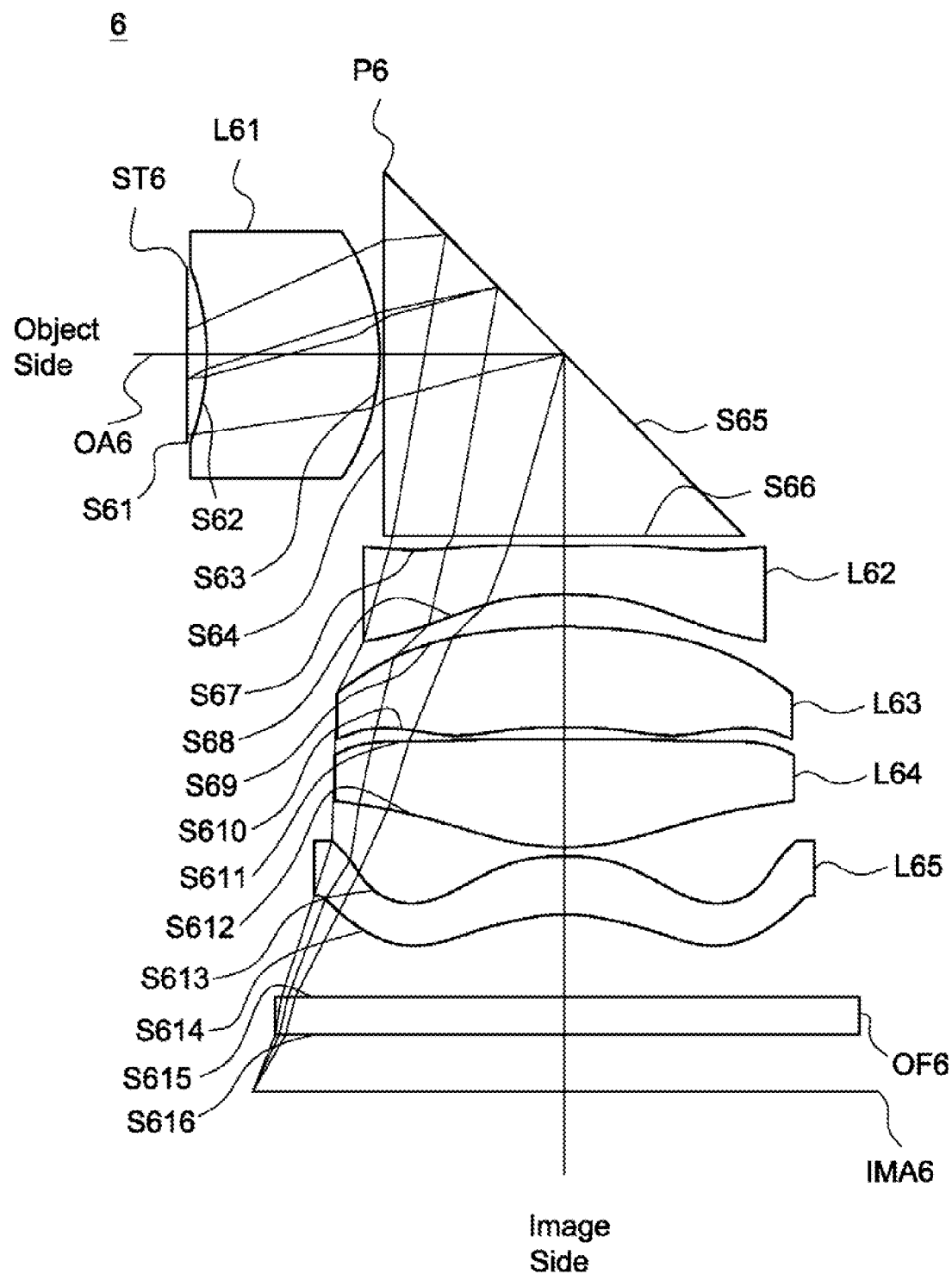
FIG. 11 is a lens layout and optical path diagram of a lens assembly in accordance with a sixth embodiment of the invention.

Referring to FIG. 11, the lens assembly 6 includes a stop ST6, a first lens L61, a reflective element P6, a second lens L62, a third lens L63, a fourth lens L64, a fifth lens L65, and tive element may be a reflective mirror which only includes a reflective surface.

According to the foregoing, wherein: the third lens L63 is a meniscus lens with negative refractive power, wherein the object side surface S69 is a convex surface and the image side surface S610 is a concave surface; the fourth lens L64 is a meniscus lens, wherein the object side surface S611 is a concave surface; the fifth lens L65 is with positive refractive power; and both of the object side surface S615 and image side surface S616 of the optical filter OF6 are plane surfaces.

With the above design of the lenses, stop ST6, reflective element P6, and at least any one of the conditions (1)-(5) and (13)-(18) satisfied, the lens assembly 6 can have an effective shortened total lens length, an effective decreased outer diameter, an effective increased resolution, an effective corrected aberration, an effective corrected chromatic aberration, and is capable of an easy manufacture process.

Table 16 shows the optical specification of the lens assembly 6 in FIG. 11.

TABLE 16

Effective Focal Length = 2.352 mm F-number = 2.4
Total Lens Length = 6.414018 mm Field of View = 74.66 degrees

| Surface Number | Radius of Curvature (mm) | Thickness (mm) | Nd | Vd | Effective Focal Length (mm) | Remark |
|---|---|---|---|---|---|---|
| S61 | ∞ | 0.1 | | | | ST6 |
| S62 | −1.740413997 | 1.006542952 | 1.85 | 40.39 | 2.598 | L61 |
| S63 | −1.238225832 | 0.05 | | | | |
| S64 | ∞ | 1.054331462 | 2.00 | 28.3 | | P6 Incident Surface |
| S65 | ∞ | 1.054331462 | 2.00 | 28.3 | | P6 Reflective Surface |
| S66 | ∞ | 0.05 | | | | P6 Exit Surface |
| S67 | 8.54915082 | 0.29487881 | 1.67 | 19.2 | −2.905 | L62 |
| S68 | 1.57757636 | 0.18679767 | | | | |
| S69 | 2.25690182 | 0.58720519 | 1.535218308 | 56.11525368 | −35.55 | L63 |
| S610 | 1.83481757 | 0.09048118 | | | | |
| S611 | −10.61259182 | 0.59838168 | 1.535218308 | 56.11525368 | 3.828 | L64 |
| S612 | −1.75577254 | 0.06010465 | | | | |
| S613 | 0.91392142 | 0.34308493 | 1.535218308 | 56.11525368 | 3.941 | L65 |
| S614 | 1.39777675 | 0.5 | | | | |
| S615 | ∞ | 0.21 | 1.52 | 64.2 | | OF6 |
| S616 | ∞ | 0.32787752 | | | | |

The definition of aspheric surface sag z of each aspheric lens in table 16 is the same as that of in Table 1, and is not described here again.

In the sixth embodiment, the conic constant k and the aspheric coefficients A, B, C, D, E, F, G, H, I of each aspheric lens are shown in Table 17.

Figure 12A:
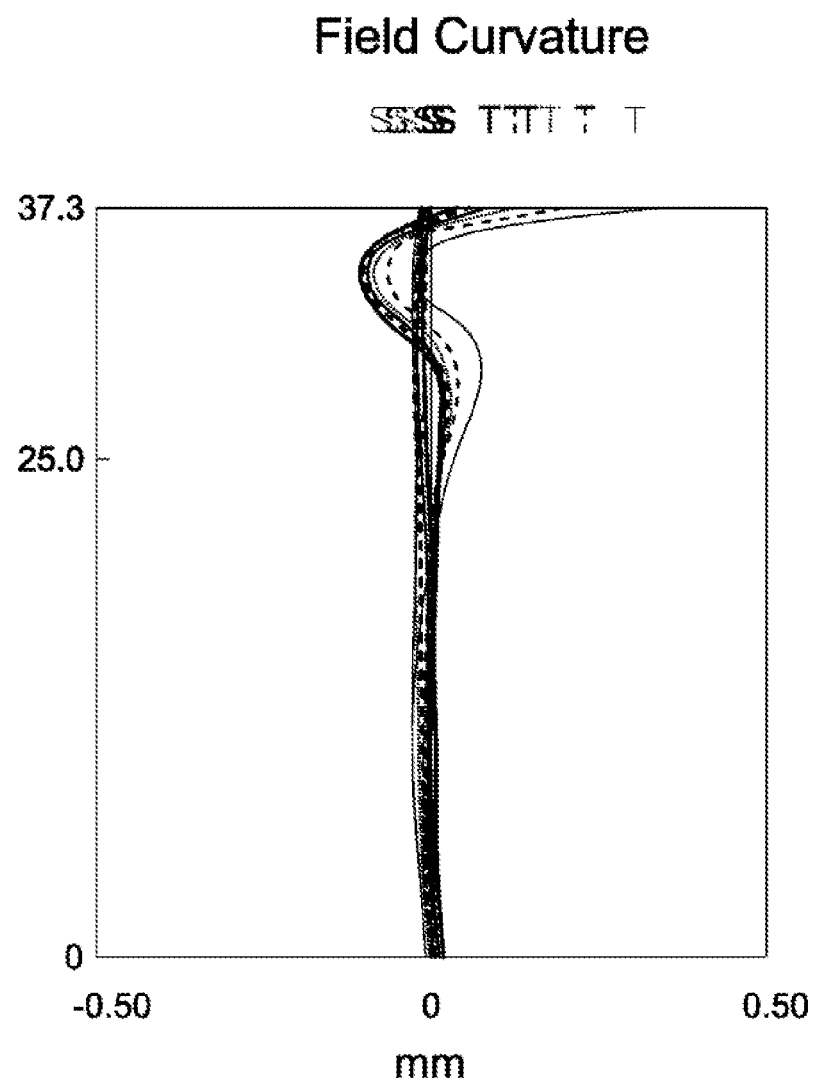
FIG. 12A, FIG. 12B, and FIG. 12C depict a field curvature diagram, a distortion diagram, and a modulation transfer function diagram of the lens assembly respectively in accordance with the sixth embodiment of the invention.
Figure 12B:
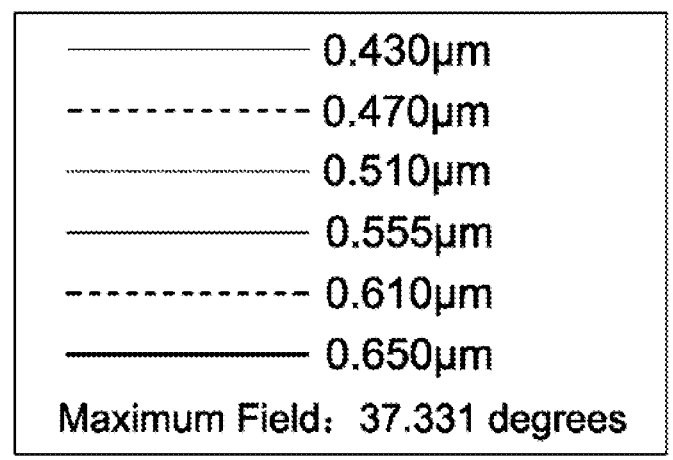
Figure 12B:
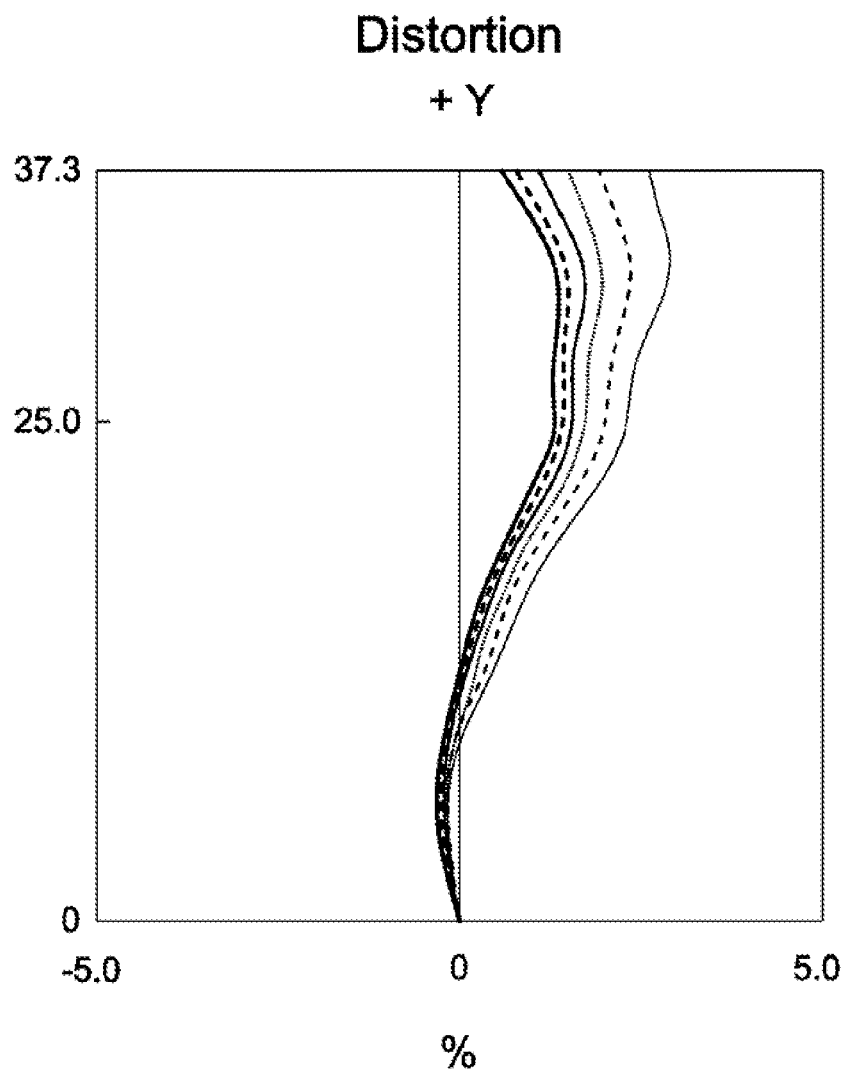
Figure 12C:
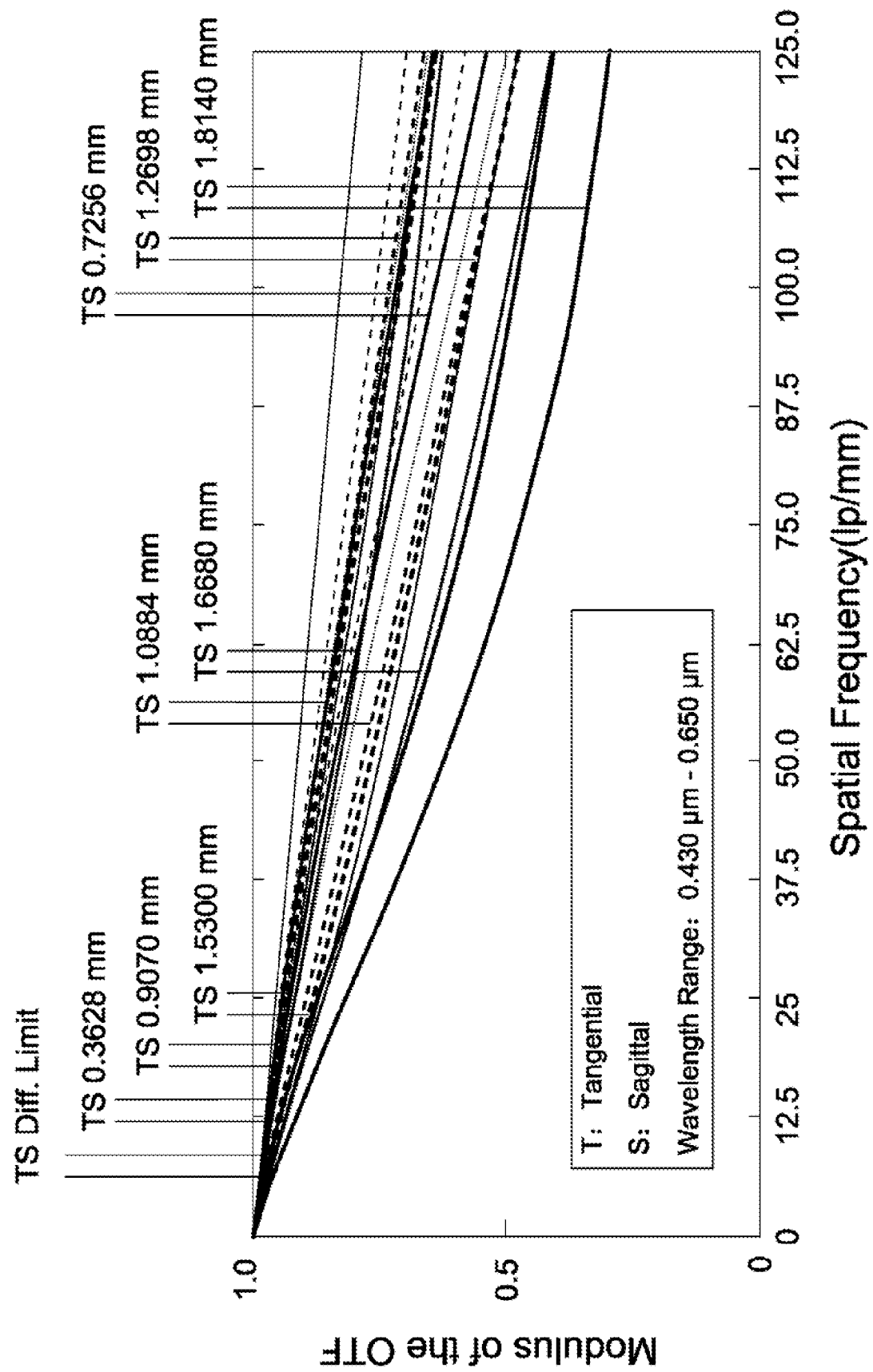

In addition, the lens assembly 6 of the sixth embodiment can meet the requirements of optical performance as seen in FIGS. 12A-12C. It can be seen from FIG. 12A that the field curvature of tangential direction and sagittal direction in the lens assembly 6 of the sixth embodiment ranges from −0.1 mm to 0.4 mm. It can be seen from FIG. 12B that the

TABLE 17

| Surface Number | k | A | B | C | D | E | F |
|---|---|---|---|---|---|---|---|
| | | G | H | I | | | |
| S62 | 4.432740462 | 0.010764626 | 0.21968427 | −1.885123398 | 5.929518046 | 38.42501078 | −259.9227724 |
| | | 422.9781425 | 0 | 0 | | | |
| S63 | 0.926620236 | 0.09605128 | 0.191269033 | −0.53102089 | 1.163868838 | −0.063169413 | −1.947773676 |
| | | 1.766822598 | 0 | 0 | | | |
| S67 | 58.47570306 | 0.009977518 | 0.062854517 | 0.176525119 | −0.68184053 | 1.051334074 | −0.776719634 |
| | | 0.222747751 | 0 | 0 | | | |
| S68 | 0.361834987 | 0.12279405 | −0.010838413 | 0.016986132 | 0.01830016 | 0.00378226 | −0.016344568 |
| | | 0.006310691 | 0 | 0 | | | |
| S69 | −28.59459118 | 0.01713649 | −0.120013871 | 0.026837936 | 0.036648217 | −0.011110027 | −0.010743742 |
| | | 0.004555882 | 0 | 0 | | | |
| S610 | −37.08756609 | 0.20380597 | −0.134444622 | 0.070263813 | −0.013100146 | −0.01677969 | −0.0031976 |
| | | 0.004611458 | 0 | 0 | | | |
| S611 | 57.33320315 | −0.082667797 | 0.029695028 | −0.011337166 | 0.008089738 | −0.000245386 | −0.005151514 |
| | | 0.001617653 | 0 | 0 | | | |
| S612 | 0.063401978 | −0.074214845 | −0.055768944 | 0.009649235 | 0.007764448 | −0.002074531 | −0.000614818 |
| | | 0.000296749 | 0 | 0 | | | |
| S613 | −2.776066849 | 0.000788809 | 0.137363316 | 0.009312183 | 0.003889615 | −0.010694935 | 0.001128218 |
| | | −3.323E−05 | 0 | 0 | | | |
| S614 | −0.654390403 | 0.154564126 | 0.070186096 | −0.007295362 | −0.001770642 | 5.7785E−07 | −0.001745787 |
| | | 0.000414664 | 0 | 0 | | | |

Table 18 shows the parameters and condition values for conditions (1)-(5) and (13)-(18) in accordance with the sixth embodiment of the invention. It can be seen from Table 18 that the lens assembly 6 of the sixth embodiment satisfies the conditions (1)-(5) and (13)-(18).

distortion in the lens assembly 6 of the sixth embodiment ranges from −1% to 3%. It can be seen from FIG. 12C that the modulation transfer function of tangential direction and sagittal direction in the lens assembly 6 of the sixth embodiment ranges from 0.29 to 1.0. It is obvious that the field

TABLE 18

| | | | | | | |
|---|---|---|---|---|---|---|
| SD1 | 1.42 mm | SD2 | | 2.38 mm | SD3 | 2.72 mm |
| SD4 | 2.78 mm | SD5 | | 3 mm | MT | 2.11 mm |
| L | 2.11 mm | | | | | |
| $(f_1 + f)/SD1$ | 3.49 | $R_{11}/R_{52}$ | | −1.25 | $f_1/L1T$ | 2.57 |
| $R_{11}/L1T$ | −1.72 | MT/(SD2 + SD3 + SD4 + SD5) | | 0.19 | TTL/SD1 | 4.52 |
| MT/L1T | 2.09 | $f_1 \times f_4$ | | 9.95 mm² | $f_2 \times f_4$ | −11.12 mm² |
| $f_1/L$ | 1.23 | | | | | | curvature and the distortion of the lens assembly 6 of the sixth embodiment can be corrected effectively, and the resolution of the lens assembly 6 of the sixth embodiment can meet the requirement. Therefore, the lens assembly 6 of the sixth embodiment is capable of good optical performance.

Figure 13:
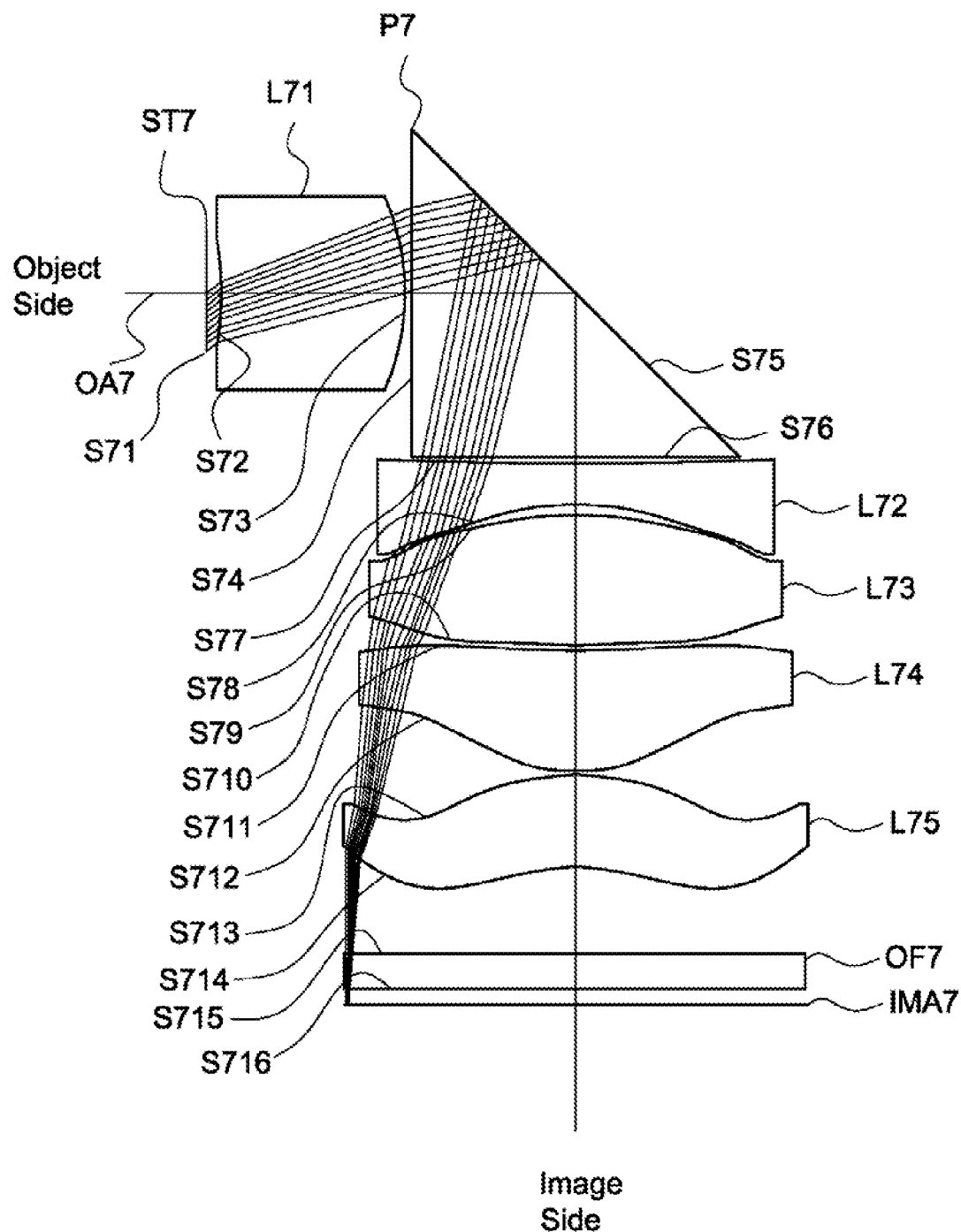
FIG. 13 is a lens layout and optical path diagram of a lens assembly in accordance with a seventh embodiment of the invention.

Referring to FIG. 13, the lens assembly 7 includes a stop ST7, a first lens L71, a reflective element P7, a second lens L72, a third lens L73, a fourth lens L74, a fifth lens L75, and an optical filter OF7, all of which are arranged in order from an object side to an image side along an axis OA7. The incident surface S74 and the exit surface S76 of the reflective element P7 are perpendicular to each other. In operation, the light from the object side is reflected by the reflective surface S75 to change the propagation direction and imaged on an image plane IMA7. The image plane IMA7 and the exit surface S76 are parallel to each other. In the seventh embodiment, the reflective element takes a prism as an example but is not limited thereto. For example, the reflective element may be a reflective mirror which only includes a reflective surface.

According to the foregoing, wherein: the third lens L73 is a biconvex lens with positive refractive power, wherein the object side surface S79 is a convex surface and the image side surface S710 is a convex surface; the fourth lens L74 is a meniscus lens, wherein the object side surface S711 is a concave surface; the fifth lens L75 is with positive refractive power; and both of the object side surface S715 and image side surface S716 of the optical filter OF7 are plane surfaces.

With the above design of the lenses, stop ST7, reflective element P7, and at least any one of the conditions (1)-(5) and (13)-(18) satisfied, the lens assembly 7 can have an effective shortened total lens length, an effective decreased outer diameter, an effective increased resolution, an effective corrected aberration, an effective corrected chromatic aberration, and is capable of an easy manufacture process.

Table 19 shows the optical specification of the lens assembly 7 in FIG. 13.

TABLE 19

Effective Focal Length = 1.661 mm F-number = 2.4
Total Lens Length = 6.484 mm Field of View = 75 degrees

| Surface Number | Radius of Curvature (mm) | Thickness (mm) | Nd | Vd | Effective Focal Length (mm) | Remark |
|---|---|---|---|---|---|---|
| S71 | ∞ | 0.1 | | | | ST7 |
| S72 | −1.76E+00 | 1.108 | 1.85 | 40.4 | 2.87 | L71 |
| S73 | −1.33E+00 | 0.040 | | | | |
| S74 | ∞ | 1.000 | 2.00 | 28.3 | | P7 Incident Surface |
| S75 | ∞ | 1.000 | 2.00 | 28.3 | | P7 Reflective Surface |
| S76 | ∞ | 0.029 | | | | P7 Exit Surface |
| S77 | −4.158 | 0.252 | 1.67 | 19.2 | −2.2 | L72 |
| S78 | −1.073 | 0.073 | | | | |
| S79 | −2.780 | 0.782 | 1.53 | 56.1 | 4.96 | L73 |
| S710 | 57.898 | 0.045 | | | | |
| S711 | 3.525 | 0.735 | 1.53 | 56.1 | 2.07 | L74 |
| S712 | 0.909 | 0.020 | | | | |
| S713 | −1.176 | 0.556 | 1.53 | 56.1 | 14.92 | L75 |
| S714 | −1.150 | 0.534 | | | | |
| S715 | ∞ | 0.21 | 1.52 | 64.2 | | OF7 |
| S716 | ∞ | 0.10 | | | | |

The definition of aspheric surface sag z of each aspheric lens in table 19 is the same as that of in Table 1, and is not described here again.

In the seventh embodiment, the conic constant k and the aspheric coefficients A, B, C, D, E, F, G, H, I of each aspheric lens are shown in Table 20.

TABLE 20

| Surface Number | k | A | B | C | D | E | F |
|---|---|---|---|---|---|---|---|
| | | G | H | I | | | |
| S72 | 1.58E+01 | 3.90E−01 | −7.54E−01 | 3.54E+01 | −8.55E+01 | −1.57E+03 | 3.05E+03 |
| | | 8.05E+04 | 1.77E+05 | −5.77E+06 | | | |
| S73 | 2.50E+00 | 1.68E−01 | 5.77E−01 | −1.02E−01 | −1.29E+01 | 4.15E+01 | 4.35E+02 |
| | | −3.23E+03 | 7.92E+03 | −1.36E+04 | | | |
| S77 | 1.06E+00 | 4.98E−01 | −4.89E−01 | 5.00E−01 | −6.70E+00 | 2.41E+01 | −4.01E+01 |
| | | 3.59E+01 | −1.68E+01 | 6.53E+00 | | | |
| S78 | 1.20E+00 | 6.54E−01 | −7.19E−01 | 3.04E−01 | 1.54E−01 | −9.50E−02 | −9.93E−02 |
| | | 7.29E−02 | −4.38E−03 | −4.34E−03 | | | |
| S79 | 1.21E+00 | −3.89E−01 | 5.64E−01 | −3.05E−01 | −8.70E−02 | 4.62E−02 | 1.72E−01 |
| | | −1.45E−01 | 2.15E−02 | 1.46E−02 | | | |
| S710 | 1.25E+00 | 5.93E−02 | 1.57E−02 | 1.14E−02 | −1.38E−03 | −5.13E−03 | −2.13E−03 |
| | | −9.30E−04 | 3.05E−04 | 5.90E−04 | | | |
| S711 | 1.28E+00 | −2.95E−02 | −9.33E−03 | −2.86E−03 | −1.48E−03 | 1.01E−03 | 2.72E−04 |
| | | −2.26E−04 | −4.39E−05 | 5.55E−04 | | | |

TABLE 20-continued

| Surface Number | k | A G | B H | C I | D | E | F |
|---|---|---|---|---|---|---|---|
| S712 | 1.32E+00 | −2.12E−01 | −4.22E−02 | −1.17E−01 | 1.06E−01 | 3.39E−02 | −4.84E−02 |
|  |  | −2.37E−02 | 3.21E−02 | −1.55E−02 |  |  |  |
| S713 | 1.35E+00 | 8.31E−02 | −5.96E−02 | 1.31E−03 | 1.36E−01 | −1.44E−01 | 6.50E−02 |
|  |  | 7.13E−03 | −1.73E−02 | 8.12E−03 |  |  |  |
| S714 | 1.40E+00 | 5.96E−01 | −3.16E−01 | 7.74E−02 | 4.64E−02 | −1.47E−02 | −9.43E−03 |
|  |  | 2.21E−03 | 1.91E−03 | −1.32E−03 |  |  |  |

Table 21 shows the parameters and condition values for conditions (1)-(5) and (13)-(18) in accordance with the seventh embodiment of the invention. It can be seen from Table 21 that the lens assembly 7 of the seventh embodiment satisfies the conditions (1)-(5) and (13)-(18).

TABLE 21

| SD1 | 1.18 mm | SD2 | 2.4 mm | SD3 | 2.5 mm |
|---|---|---|---|---|---|
| SD4 | 2.64 mm | SD5 | 2.8 mm | MT | 2 mm |
| L | 2.148 mm |  |  |  |  |
| $(f_1 + f)/SD1$ | 3.84 | $R_{11}/R_{52}$ | −1.53 | $f_1/L1T$ | 2.59 |
| $R_{11}/L1T$ | −1.59 | MT/(SD2 + SD3 + SD4 + SD5) | 0.19 | TTL/SD1 | 5.49 |
| MT/L1T | 1.81 | $f_1 \times f_4$ | 5.94 mm² | $f_2 \times f_4$ | −4.56 mm² |
| $f_1/L$ | 1.34 |  |  |  |  |

Figure 14A:
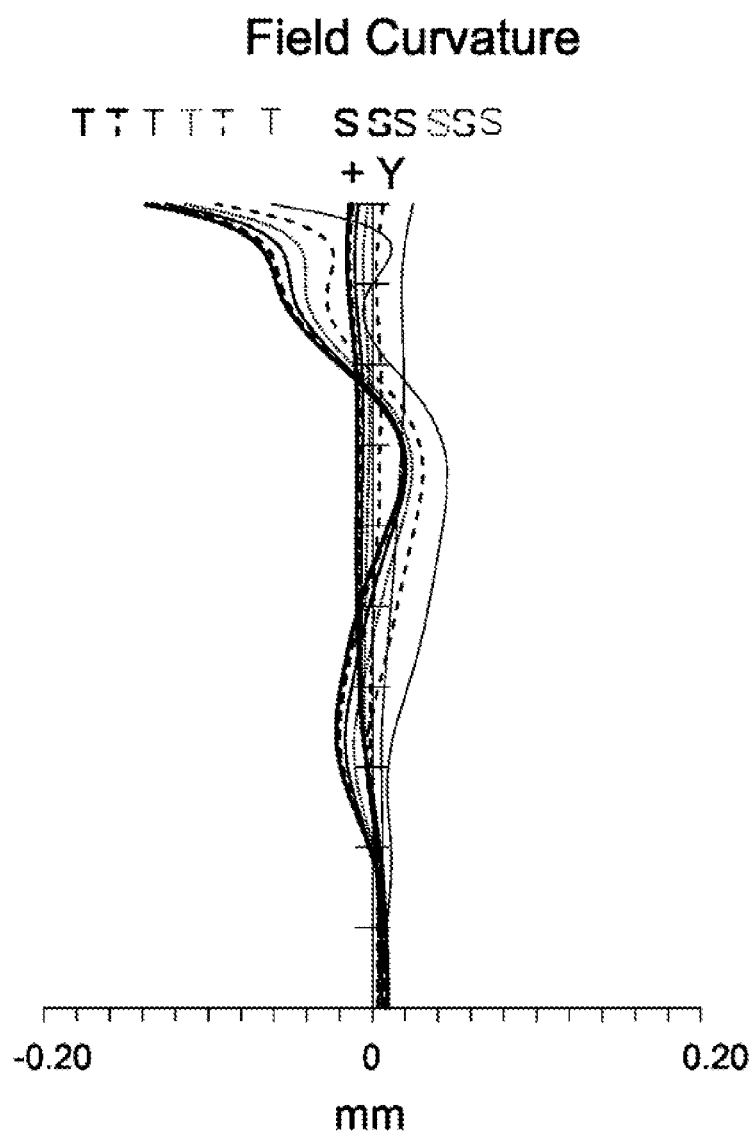
FIG. 14A, FIG. 14B, and FIG. 14C depict a field curvature diagram, a distortion diagram, and a modulation transfer function diagram of the lens assembly respectively in accordance with the seventh embodiment of the invention.
Figure 14B:
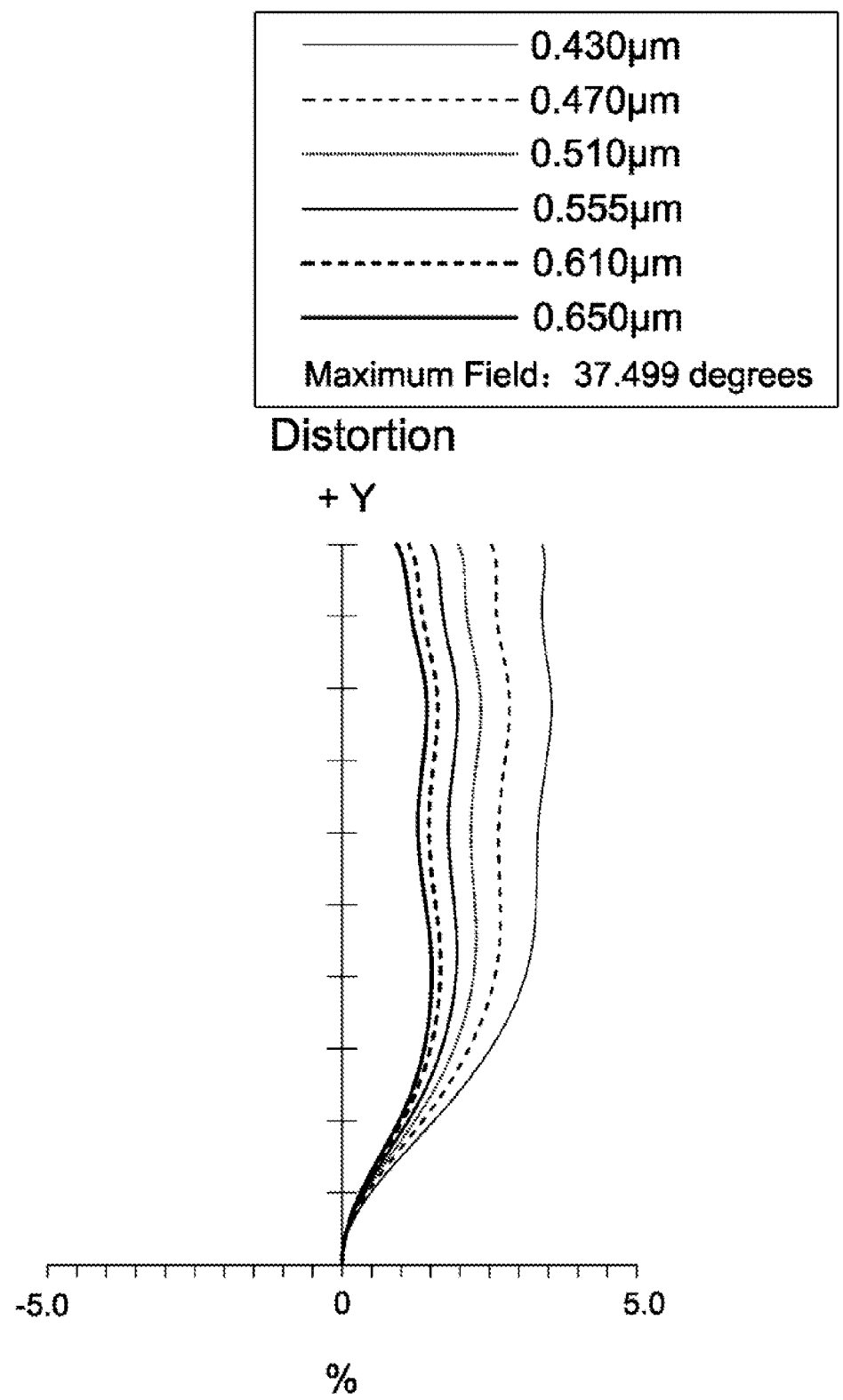
Figure 14C:
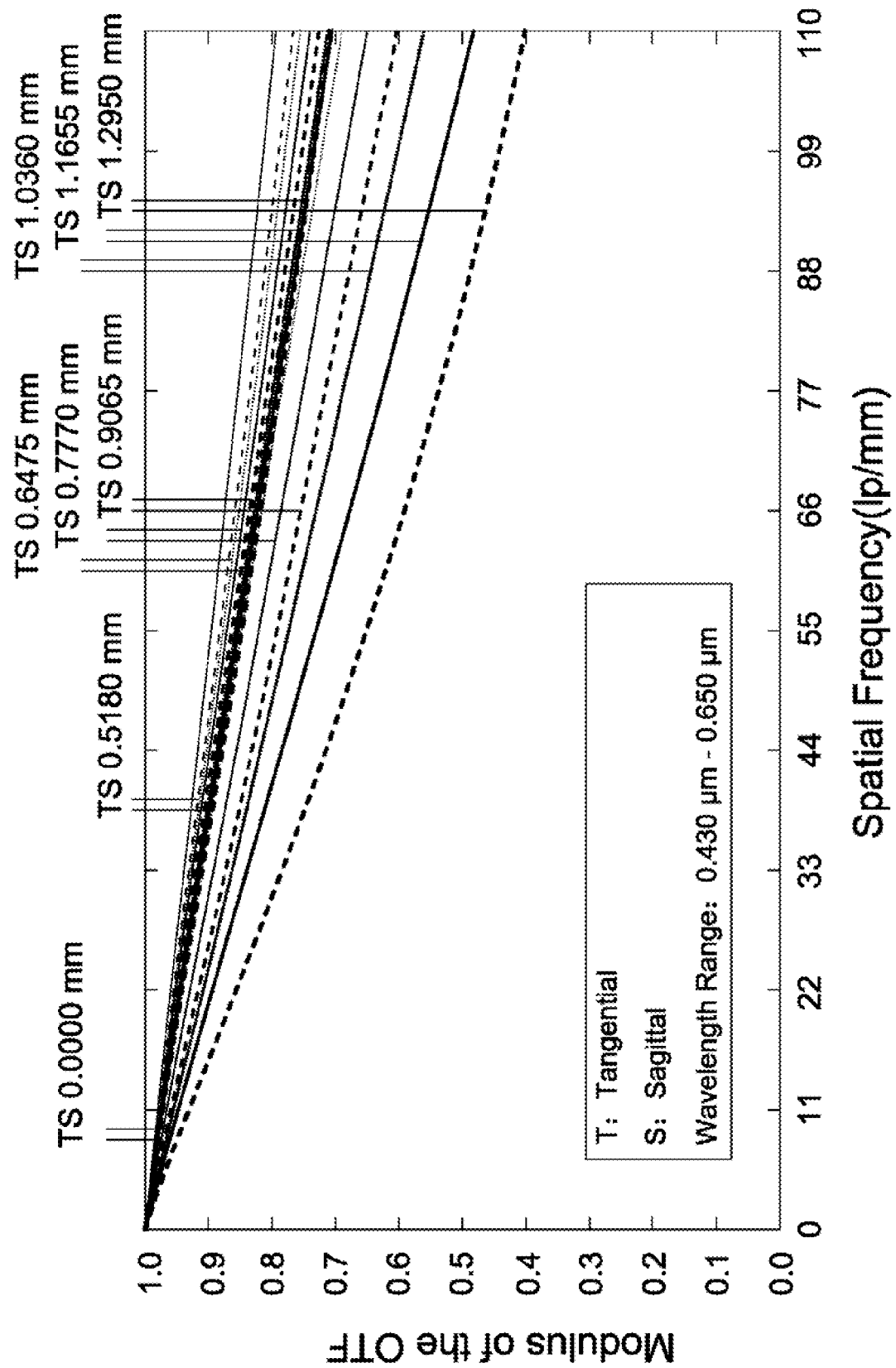

In addition, the lens assembly 7 of the seventh embodiment can meet the requirements of optical performance as seen in FIGS. 14A-14C. It can be seen from FIG. 14A that the field curvature of tangential direction and sagittal direction in the lens assembly 7 of the seventh embodiment ranges from −0.14 mm to 0.05 mm. It can be seen from FIG. 14B that the distortion in the lens assembly 7 of the seventh embodiment ranges from 0% to 4%. It can be seen from FIG. 14C that the modulation transfer function of tangential direction and sagittal direction in the lens assembly 7 of the seventh embodiment ranges from 0.40 to 1.0. It is obvious that the field curvature and the distortion of the lens assembly 7 of the seventh embodiment can be corrected effectively, and the resolution of the lens assembly 7 of the seventh embodiment can meet the requirement. Therefore, the lens assembly 7 of the seventh embodiment is capable of good optical performance.

Figure 15:
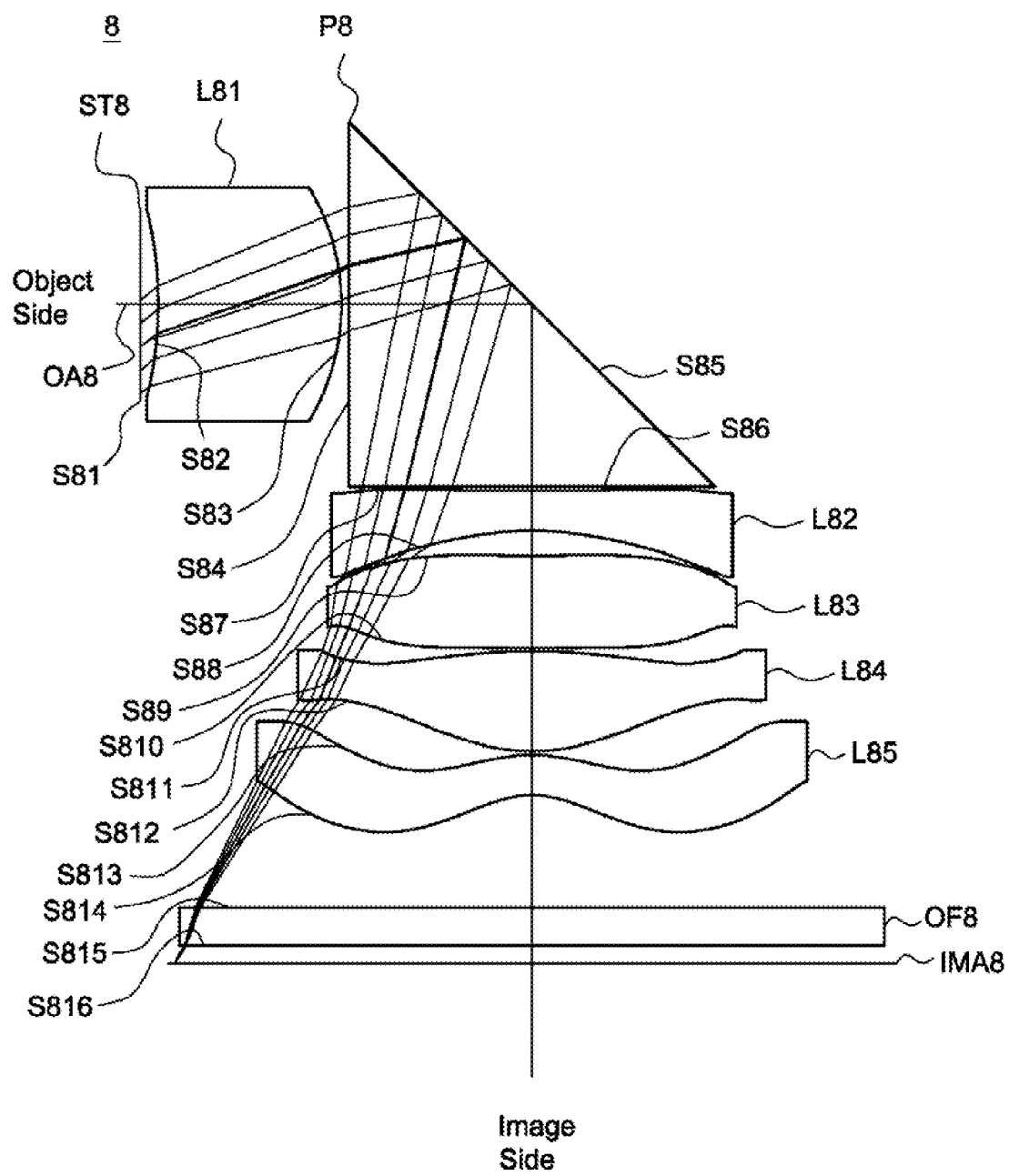
FIG. 15 is a lens layout and optical path diagram of a lens assembly in accordance with an eighth embodiment of the invention.

Referring to FIG. 15, the lens assembly 8 includes a stop ST8, a first lens L81, a reflective element P8, a second lens L82, a third lens L83, a fourth lens L84, a fifth lens L85, and an optical filter OF8, all of which are arranged in order from an object side to an image side along an axis OA8. The incident surface S84 and the exit surface S86 of the reflective element P8 are perpendicular to each other. In operation, the light from the object side is reflected by the reflective surface S85 to change the propagation direction and imaged on an image plane IMA8. The image plane IMA8 and the exit surface S86 are parallel to each other. In the eighth embodiment, the reflective element takes a prism as an example but is not limited thereto. For example, the reflective element may be a reflective mirror which only includes a reflective surface.

According to the foregoing, wherein: the third lens L83 is a meniscus lens with negative refractive power, wherein the object side surface S89 is a concave surface and the image side surface S810 is a convex surface; the fourth lens L84 is a biconvex lens, wherein the object side surface S811 is a convex surface; the fifth lens L85 is with negative refractive power; and both of the object side surface S815 and image side surface S816 of the optical filter OF8 are plane surfaces.

With the above design of the lenses, stop ST8, reflective element P8, and at least any one of the conditions (1)-(5) and (13)-(18) satisfied, the lens assembly 8 can have an effective shortened total lens length, an effective decreased outer diameter, an effective increased resolution, an effective corrected aberration, an effective corrected chromatic aberration, and is capable of an easy manufacture process.

Table 22 shows the optical specification of the lens assembly 8 in FIG. 15.

TABLE 22

Effective Focal Length = 2.36 mm F-number = 2.4
Total Lens Length = 5.653 mm Field of View = 75 degrees

| Surface Number | Radius of Curvature (mm) | Thickness (mm) | Nd | Vd | Effective Focal Length (mm) | Remark |
|---|---|---|---|---|---|---|
| S81 | ∞ | 0.1 |  |  |  | ST8 |
| S82 | −2.56 | 1.000 | 1.72 | 53.5 | 2.28 | L81 |
| S83 | −1.17 | 0.040 |  |  |  |  |
| S84 | ∞ | 1.000 | 2.00 | 28.3 |  | P8 Incident Surface |
| S85 | ∞ | 1.000 | 2.00 | 28.3 |  | P8 Reflective Surface |
| S86 | ∞ | 0.020 |  |  |  | P8 Exit Surface |
| S87 | −22.284 | 0.220 | 1.67 | 19.2 | −2.57 | L82 |
| S88 | −1.611 | 0.138 |  |  |  |  |
| S89 | 6.865 | 0.504 | 1.53 | 56.1 | −24.3 | L83 |
| S810 | 14.843 | 0.020 |  |  |  |  |
| S811 | −3.742 | 0.546 | 1.53 | 56.1 | 1.54 | L84 |

TABLE 22-continued

Effective Focal Length = 2.36 mm F-number = 2.4
Total Lens Length = 5.653 mm Field of View = 75 degrees

| Surface Number | Radius of Curvature (mm) | Thickness (mm) | Nd | Vd | Effective Focal Length (mm) | Remark |
|---|---|---|---|---|---|---|
| S812 | 1.011 | 0.020 | | | | |
| S813 | −0.843 | 0.220 | 1.53 | 56.1 | −3.15 | L85 |
| S814 | −0.511 | 0.615 | | | | |
| S815 | ∞ | 0.21 | 1.52 | 64.2 | | OF8 |
| S816 | ∞ | 0.10 | | | | |

The definition of aspheric surface sag z of each aspheric lens in table 22 is the same as that of in Table 1, and is not described here again.

In the eighth embodiment, the conic constant k and the aspheric coefficients A, B, C, D, E, F, G, H, I of each aspheric lens are shown in Table 23.

TABLE 23

| Surface Number | k | A G | B H | C I | D | E | F |
|---|---|---|---|---|---|---|---|
| S82 | 2.38E+01 | 2.00E−01<br>7.70E+04 | −3.55E+00<br>−3.66E+05 | 3.52E+01<br>1.08E+06 | 1.13E+01 | −1.36E+03 | −7.08E+02 |
| S83 | 1.20E+00 | 1.51E−01<br>−3.30E+03 | 3.61E−01<br>7.51E+03 | −2.63E−02<br>−1.19E+04 | −1.68E+01 | 5.32E+01 | 4.66E+02 |
| S87 | 1.03E+00 | 2.10E−01<br>3.61E+01 | −3.09E−01<br>−1.67E+01 | 7.84E−01<br>6.33E+00 | −6.93E+00 | 2.39E+01 | −4.01E+01 |
| S88 | 1.09E+00 | 3.67E−01<br>5.34E−02 | −5.46E−01<br>−1.03E−02 | 2.90E−01<br>9.09E−03 | 1.64E−01 | −9.81E−02 | −1.14E−01 |
| S89 | 1.11E+00 | −3.94E−01<br>−1.57E−01 | 4.03E−01<br>1.25E−02 | −2.50E−01<br>8.34E−03 | −5.07E−02 | 4.52E−02 | 1.61E−01 |
| S810 | 1.12E+00 | −9.10E−02<br>−4.77E−03 | 1.62E−01<br>4.80E−03 | 1.14E−01<br>1.12E−02 | −4.90E−02 | −5.43E−02 | −2.04E−02 |
| S811 | 1.15E+00 | −9.78E−03<br>−4.95E−02 | 9.50E−02<br>−1.83E−02 | −5.83E−02<br>5.75E−02 | 7.34E−02 | 4.54E−02 | −2.35E−02 |
| S812 | 1.27E+00 | −3.23E−01<br>−2.27E−02 | 6.66E−02<br>3.23E−02 | −1.20E−01<br>−1.51E−02 | 8.85E−02 | 2.86E−02 | −4.87E−02 |
| S813 | 1.34E+00 | 5.91E−01<br>1.88E−03 | −2.34E−01<br>−1.91E−02 | −1.24E−01<br>1.15E−02 | 1.80E−01 | −1.22E−01 | 6.03E−02 |
| S814 | 1.49E+00 | 6.22E−01<br>1.13E−03 | −4.01E−01<br>1.26E−03 | 7.20E−02<br>−6.40E−04 | 4.47E−02 | −1.01E−02 | −7.93E−03 |

Table 24 shows the parameters and condition values for conditions (1)-(5) and (13)-(18) in accordance with the eighth embodiment of the invention. It can be seen from Table 24 that the lens assembly 8 of the eighth embodiment satisfies the conditions (1)-(5) and (13)-(18).

TABLE 24

| SD1 | 1.25 mm | SD2 | | 2.19 mm | SD3 | 2.23 mm |
|---|---|---|---|---|---|---|
| SD4 | 2.55 mm | SD5 | | 2.98 mm | MT | 2 mm |
| L | 2.04 mm | | | | | |
| $(f_1 + f)/SD1$ | 3.71 | $R_{11}/R_{52}$ | | −5.00 | $f_1/L1T$ | 2.28 |
| $R_{11}/L1T$ | −2.56 | MT/(SD2 + SD3 + SD4 + SD5) | | 0.20 | TTL/SD1 | 4.52 |
| MT/L1T | 2 | $f_1 \times f_4$ | | 3.51 mm² | $f_2 \times f_4$ | −3.96 mm² |
| $f_1/L$ | 1.12 | | | | | |

Figure 16A:
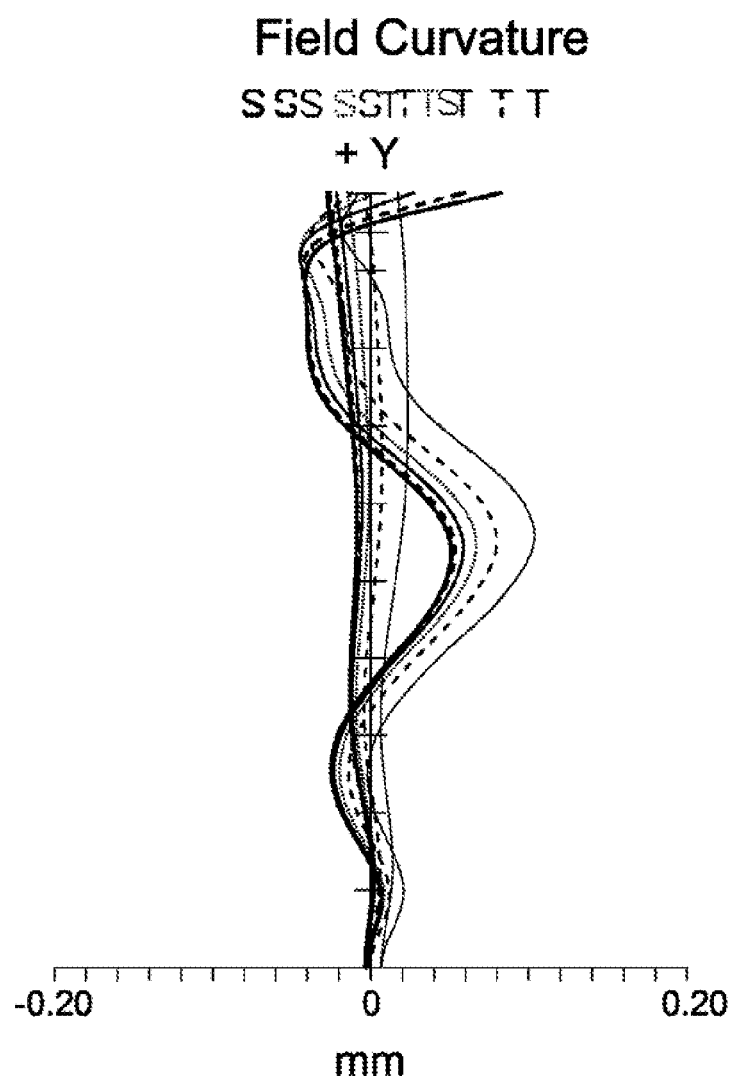
FIG. 16A, FIG. 16B, and FIG. 16C depict a field curvature diagram, a distortion diagram, and a modulation transfer function diagram of the lens assembly respectively in accordance with the eighth embodiment of the invention.
Figure 16B:
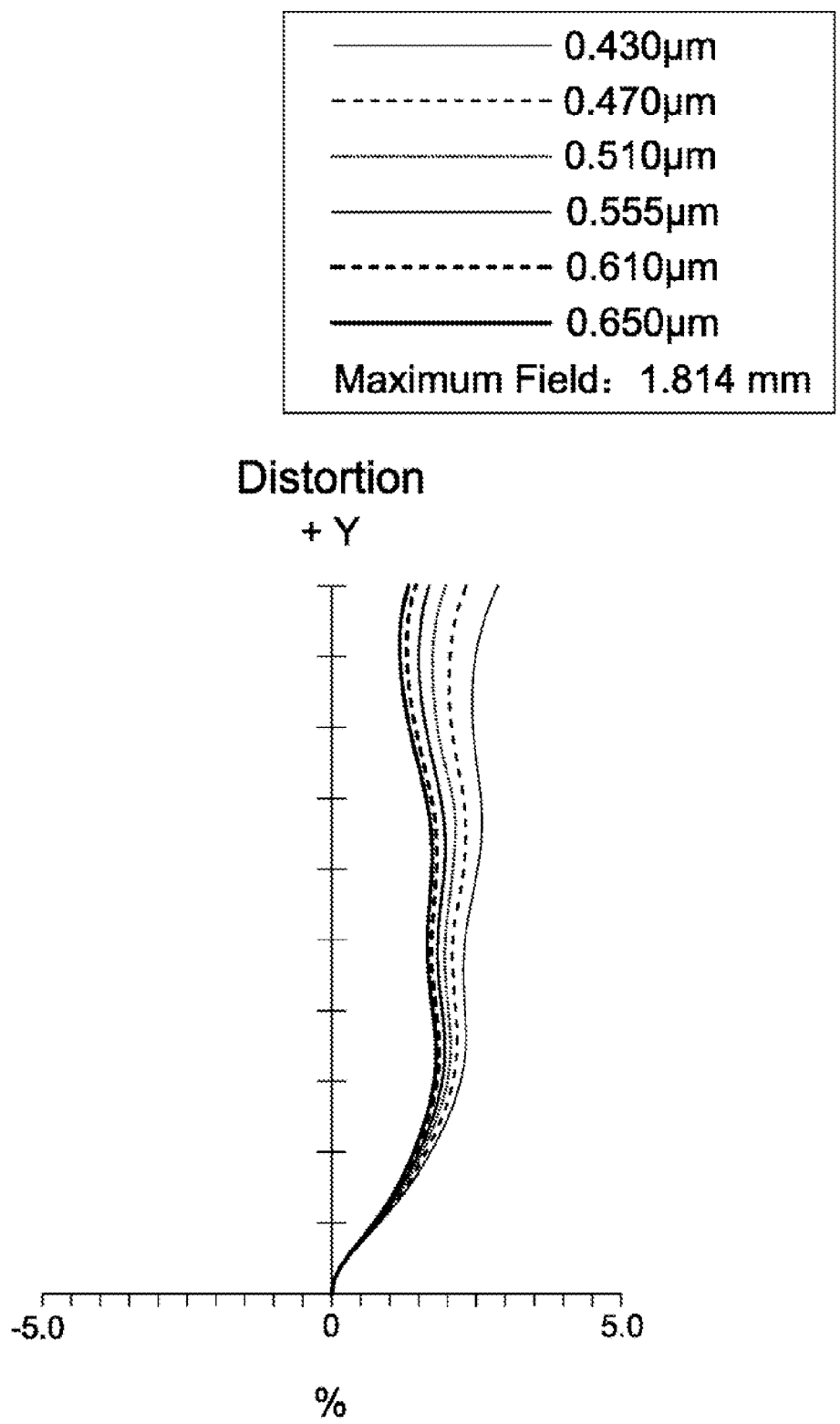
Figure 16C:
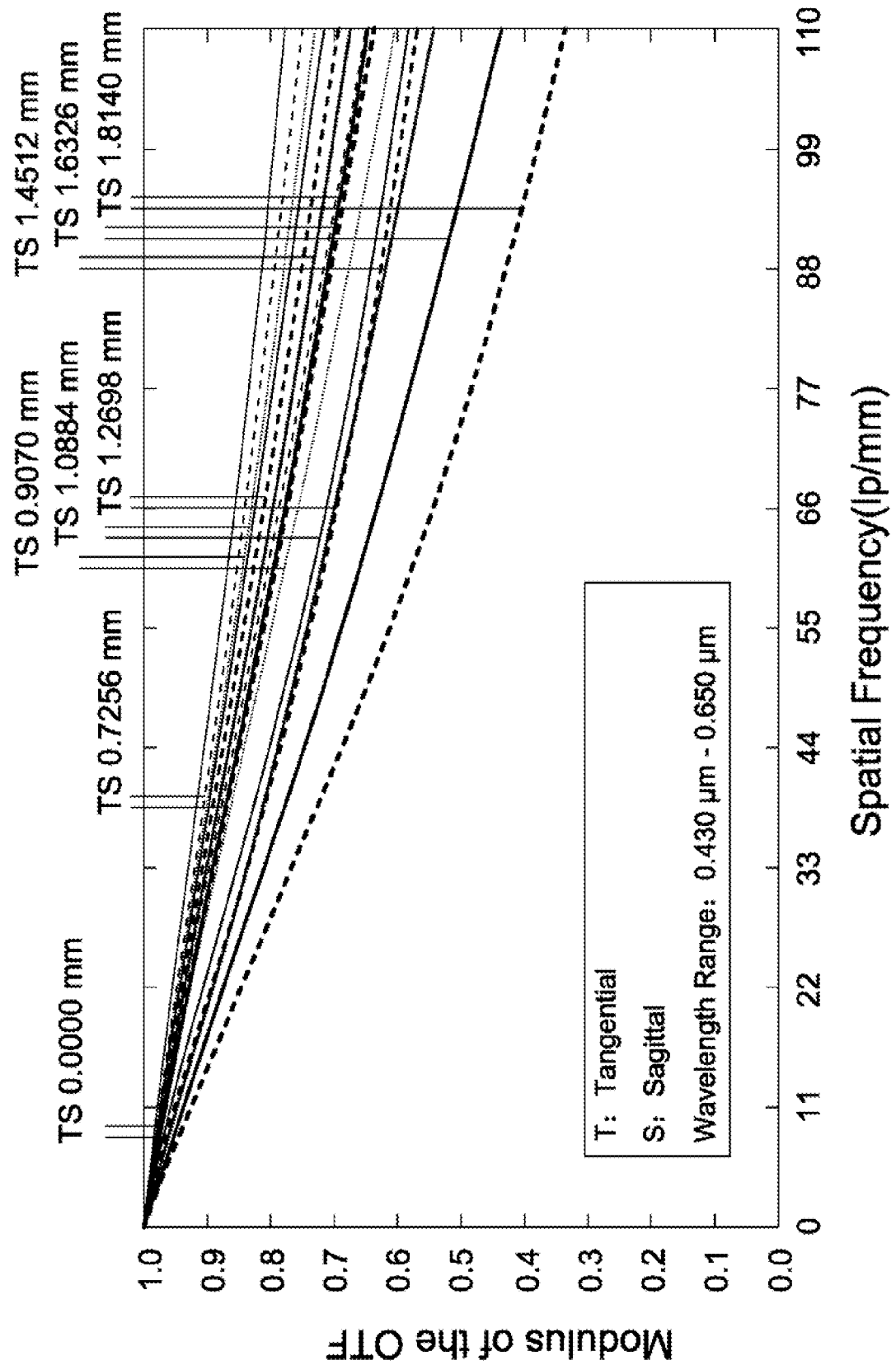

In addition, the lens assembly 8 of the eighth embodiment can meet the requirements of optical performance as seen in FIGS. 16A-16C. It can be seen from FIG. 16A that the field curvature of tangential direction and sagittal direction in the lens assembly 8 of the eighth embodiment ranges from −0.06 mm to 0.10 mm. It can be seen from FIG. 16B that the distortion in the lens assembly 8 of the eighth embodiment ranges from 0% to 3%. It can be seen from FIG. 16C that the modulation transfer function of tangential direction and sagittal direction in the lens assembly 8 of the eighth embodiment ranges from 0.34 to 1.0. It is obvious that the field curvature and the distortion of the lens assembly 8 of the eighth embodiment can be corrected effectively, and the resolution of the lens assembly 8 of the eighth embodiment can meet the requirement. Therefore, the lens assembly 8 of the eighth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly consisting of:
   a cover glass;
   a stop;
   a first lens which is with refractive power and comprises a concave surface facing an object side along an axis;
   a second lens which is with refractive power and comprises a convex surface facing the object side along the axis;
   a third lens which is with refractive power;
   a fourth lens which is with refractive power and comprises a convex surface facing the object side along the axis and a concave surface facing an image side along the axis;
   a fifth lens which is with refractive power;
   an optical filter; and
   a reflective element which comprises a reflective surface;
   wherein the cover glass, the stop, the first lens, the second lens, the third lens, the fourth lens, the fifth lens, and the optical filter are arranged in order from the object side to the image side along the axis;
   wherein the reflective element is disposed between the first lens and the fifth lens;
   wherein the lens assembly satisfies the following conditions:

$0.5 < SD1/L1T < 3;$ wherein SD1 is an effective optical diameter of the first lens and L1T is a thickness along the axis of the first lens.

2. The lens assembly as claimed in claim 1, wherein:
   the first lens is with negative refractive power;
   the second lens is with positive refractive power;
   the third lens is with positive refractive power;
   the fourth lens is with negative refractive power; and
   the fifth lens is with positive refractive power.

3. The lens assembly as claimed in claim 1, wherein:
   the first lens further comprises a plane surface or a concave surface facing the image side along the axis;
   the third lens comprises a convex surface facing the object side along the axis; and
   the fourth lens is a meniscus lens.

4. The lens assembly as claimed in claim 1, wherein the fifth lens comprises a convex surface facing the image side along the axis and another convex surface or a concave surface facing the object side along the axis.

5. The lens assembly as claimed in claim 1, wherein:
   the second lens is a meniscus lens and further comprises a concave surface facing the image side along the axis; and
   the third lens is a biconvex lens and further comprises a convex surface facing the image side along the axis.

6. The lens assembly as claimed in claim 1, wherein:
   the reflective element further comprises an incident surface facing the object side along the axis and an exit surface facing the image side along the axis; and
   the lens assembly satisfies at least any one of the following conditions:

$0.1 < SD5/TTL < 0.6;$ $2\ mm < L < 6\ mm;$ $0.5 < MT/L1T < 10;$ $0 < MT/(SD2+SD3+SD4+SD5) < 1;$ $0 < f/L1T < 5;$ $1 < TTL/L < 5;$ $0 < f/L < 2;$ $-20 < R_{11}/L1T < 0;$ $2 < ALD/f < 8;$ $-12 < f_1/L1T < 0;$ wherein MT is an interval from the incident surface to the exit surface along the axis, L1T is the thickness along the axis of the first lens, SD2 is an effective optical diameter of the second lens, SD3 is an effective optical diameter of the third lens, SD4 is an effective optical diameter of the fourth lens, and SD5 is an effective optical diameter of the fifth lens, L is an interval from the object side surface of the first lens to the reflective surface along the axis, TTL is the interval from the object side surface of the first lens to the image plane along the axis, f is an effective focal length of the lens assembly, $R_{11}$ is a radius of curvature of the object side surface of the first lens, ALD is a total sum of the effective optical diameter of all lenses of the lens assembly, and $f_1$ is an effective focal length of the first lens.

7. The lens assembly as claimed in claim 1, wherein the lens assembly satisfies the following condition:

$3 < (f_1+f)/SD1 < 5;$ $-6 < R_{11}/R_{52} < -0.5;$ $1 < f_1/L1T < 4;$ $1\ mm^2 < f_1 \times f_4 < 11\ mm^2;$ $-12\ mm^2 < f_2 \times f_4 < -1\ mm^2;$ $0.5 < f_1/L < 2.5;$ wherein $R_{11}$ is a radius of curvature of the object side surface of the first lens, $R_{52}$ is a radius of curvature of an image side surface of the fifth lens, f is an effective focal length of the lens assembly, $f_2$ is an effective focal length of the second lens, $f_4$ is an effective focal length of the fourth lens, L1T is the thickness along the axis of the first lens, SD1 is the effective optical diameter of the first lens, $f_1$ is an effective focal length of the first lens and L is the interval from the object side surface of the first lens to the reflective surface along the axis.

8. A lens assembly consisting of:
   a cover glass;
   a stop;
   a first lens which is with refractive power and comprises a concave surface facing an object side along an axis;
   a second lens which is a meniscus lens with refractive power and comprises a convex surface facing the object side along the axis and a concave surface facing the image side along the axis;
   a third lens which is a biconvex lens and comprises a convex surface facing the image side along the axis;
   a fourth lens which is with refractive power;
   a fifth lens which is with refractive power;
   an optical filter; and
   a reflective element which comprises a reflective surface;
   wherein the cover glass, the stop, the first lens, the second lens, the third lens, the fourth lens, the fifth lens, and the optical filter are arranged in order from the object side to an image side along the axis;
   wherein the reflective element is disposed between the first lens and the fifth lens;

wherein the lens assembly satisfies the following conditions:

$3.5 < TTL/SD1 \leq 14;$ wherein SD1 is an effective optical diameter of the first lens, and TTL is an interval from an object side surface of the first lens to an image plane along the axis.

9. The lens assembly as claimed in claim 8, wherein:
the first lens is with positive refractive power;
the second lens is with negative refractive power;
the fourth lens is with positive refractive power.

10. The lens assembly as claimed in claim 8, wherein:
the reflective element further comprises an incident surface facing the object side along the axis and an exit surface facing the image side along the axis; and
the lens assembly satisfies at least any one of the following conditions:

$0.1 < SD5/TTL < 0.6;$ $2 \text{ mm} < L < 6 \text{ mm};$ $0.5 < MT/L1T < 10;$ $0 < MT/(SD2+SD3+SD4+SD5) < 1;$ $0 < f/L1T < 5;$ $1 < TTL/L < 5;$ $0 < f/L < 2;$ $-20 < R_{11}/L1T < 0;$ $2 < ALD/f < 8;$ $-12 < f_1/L1T < 0;$ $0.5 < SD1/L1T < 3;$ wherein L is an interval from the object side surface of the first lens to the reflective surface along the axis, SD5 is an effective optical diameter of the fifth lens, TTL is the interval from the object side surface of the first lens to the image plane along the axis, MT is an interval from the incident surface to the exit surface along the axis, L1T is the thickness along the axis of the first lens, SD1 is an effective optical diameter of the first lens, SD2 is an effective optical diameter of the second lens, SD3 is an effective optical diameter of the third lens, SD4 is an effective optical diameter of the fourth lens, f is an effective focal length of the lens assembly, $R_{11}$ is a radius of curvature of the object side surface of the first lens, ALD is a total sum of the effective optical diameter of all lenses of the lens assembly, and $f_1$ is an effective focal length of the first lens.

11. The lens assembly as claimed in claim 8, wherein:
the first lens further comprises a convex surface facing the image side along the axis.

12. The lens assembly as claimed in claim 8, wherein:
the third lens comprises a convex surface facing the object side along the axis; and
the fifth lens is with positive refractive power.

13. The lens assembly as claimed in claim 8, wherein:
the lens assembly satisfies at least any one of the following conditions:

$0.1 < SD5/TTL < 0.6;$ $2 \text{ mm} < L < 6 \text{ mm};$ $0 < f/L1T < 5;$ $1 < TTL/L < 5;$ $0 < f/L < 2;$ $-20 < R_{11}/L1T < 0;$ $2 < ALD/f < 8;$ $-12 < f_1/L1T < 0;$ $-20 < R_{11}/L1T < 0;$ $3 < (f_1+f)/SD1 < 5;$ $-6 < R_{11}/R_{52} < -0.5;$ $1 < f_1/L1T < 4;$ $1 \text{ mm}^2 < f_1 \times f_4 < 11 \text{ mm}^2;$ $-12 \text{ mm}^2 < f_2 \times f_4 < -1 \text{ mm}^2;$ $0.5 < f_1/L < 2.5;$ wherein $R_{11}$ is a radius of curvature of the object side surface of the first lens, L1T is a thickness along the axis of the first lens, TTL is the interval from the object side surface of the first lens to the image plane along the axis, SD1 is the effective optical diameter of the first lens, L is an interval from the object side surface of the first lens to the reflective surface along the axis, SD5 is an effective optical diameter of the fifth lens, f is an effective focal length of the lens assembly, ALD is a total sum of the effective optical diameter of all lenses of the lens assembly, $f_1$ is an effective focal length of the first lens, $R_{52}$ is a radius of curvature of an image side surface of the fifth lens, $f_2$ is an effective focal length of the second lens, and $f_4$ is an effective focal length of the fourth lens;
the reflective element further comprises an incident surface facing the object side along the axis and an exit surface facing the image side along the axis; and
the lens assembly satisfies at least any one of the following conditions:

$0.5 < MT/L1T < 10;$ $0 < MT/(SD2+SD3+SD4+SD5) < 1;$ wherein MT is an interval from the incident surface to the exit surface along the axis, L1T is the thickness along the axis of the first lens, SD2 is an effective optical diameter of the second lens, SD3 is an effective optical diameter of the third lens, SD4 is an effective optical diameter of the fourth lens, and SD5 is the effective optical diameter of the fifth lens.

14. The lens assembly as claimed in claim 8, wherein the lens assembly satisfies at least any one of the following conditions:

$3 < (f_1+f)/SD1 < 5;$ $-6 < R_{11}/R_{52} < -0.5;$ $1 < f_1/L1T < 4;$ $1 \text{ mm}^2 < f_1 \times f_4 < 11 \text{ mm}^2;$ $-12 \text{ mm}^2 < f_2 \times f_4 < -1 \text{ mm}^2;$ $0.5 < f_1/L < 2.5;$ wherein $R_{11}$ is a radius of curvature of the object side surface of the first lens, $R_{52}$ is a radius of curvature of an image side surface of the fifth lens, f is an effective focal length of the lens assembly, $f_1$ is an effective focal length of the first lens, $f_2$ is an effective focal length of the second lens, $f_4$ is an effective focal length of the fourth lens, L1T is a thickness along the axis of the first lens, L is an interval from the object side surface of the first lens to the reflective surface along the axis, and SD1 is the effective optical diameter of the first lens.

15. The lens assembly as claimed in claim 8, wherein the fourth lens comprises a convex surface facing the image side along the axis and another convex surface or a concave surface facing the object side along the axis.

16. The lens assembly as claimed in claim 8, wherein the fifth lens is a meniscus lens and comprises a convex surface facing the object side along the axis and a concave surface facing the image side along the axis.

* * * * *